US007847776B2

(12) United States Patent
Ishii

(10) Patent No.: US 7,847,776 B2
(45) Date of Patent: Dec. 7, 2010

(54) DRIVE CIRCUIT OF ELECTRO-OPTICAL DEVICE, DRIVING METHOD OF ELECTRO-OPTICAL DEVICE, AND ELECTRO-OPTICAL DEVICE HAVING THE SAME

(75) Inventor: Kenya Ishii, Fujimi-cho (JP)

(73) Assignee: Seiko Epson Corporation, Tokyo (JP)

( * ) Notice: Subject to any disclaimer, the term of this patent is extended or adjusted under 35 U.S.C. 154(b) by 905 days.

(21) Appl. No.: 11/329,190

(22) Filed: Jan. 10, 2006

(65) Prior Publication Data

US 2006/0152464 A1 Jul. 13, 2006

(30) Foreign Application Priority Data

Jan. 12, 2005 (JP) ............................ 2005-004837
Jan. 17, 2005 (JP) ............................ 2005-008684

(51) Int. Cl.
*G09G 3/36* (2006.01)
*H04N 3/14* (2006.01)

(52) U.S. Cl. .......................... 345/96; 345/87; 345/103; 348/792; 348/793

(58) Field of Classification Search ........... 345/87–104, 345/96, 103; 348/790–793
See application file for complete search history.

(56) References Cited

U.S. PATENT DOCUMENTS 5,252,863 A 10/1993 Hatsuda et al.
5,621,425 A * 4/1997 Hoshino et al. ............... 345/94
6,229,515 B1 5/2001 Itoh et al.

FOREIGN PATENT DOCUMENTS

| | | | |
|---|---|---|---|
| EP | 1406242 | A2 * | 4/2004 |
| JP | 62-071932 | | 4/1987 |
| JP | 04-281294 | A | 10/1992 |
| JP | 05-313608 | A | 11/1993 |
| JP | 09-159999 | | 6/1997 |
| JP | 09-204159 | | 8/1997 |
| JP | 10-253939 | A | 9/1998 |
| JP | 11-231843 | | 8/1999 |
| JP | 11-295697 | | 10/1999 |
| JP | 2002-244623 | | 8/2002 |

* cited by examiner

*Primary Examiner*—Alexander Eisen
*Assistant Examiner*—Cory A Almeida
(74) *Attorney, Agent, or Firm*—AdvantEdge Law Group, LLC

(57) ABSTRACT

A drive circuit for driving an electro-optical device where the scanning-line driving unit and the data-line driving unit drive, in a surface inversion manner, with a first cycle, the pixel portions in odd partial surfaces in a direction parallel to the data lines among 2M (where M is a natural number) partial surfaces resulting from dividing the display surface by division lines corresponding to the scanning lines, each partial surface including n (where n is a natural number greater than or equal to 2) scanning lines, and drive the pixel portions in even partial surfaces among the 2M partial surfaces in the surface inversion manner with a second cycle complementary to the first cycle.

10 Claims, 15 Drawing Sheets

| | | | | |
|---|---|---|---|---|
| SR | H | H | L | L |
| ENB | H | L | H | L |
| O POINT | H | (L) | L | L |

S1 = S2a + S2b (AREA OF Sx: x)

S1a + S1b + S1c + ··· = S2a + S2b + S2c + ··· (AREA OF Sxx: xx)

DRIVE CIRCUIT OF ELECTRO-OPTICAL DEVICE, DRIVING METHOD OF ELECTRO-OPTICAL DEVICE, AND ELECTRO-OPTICAL DEVICE HAVING THE SAME

BACKGROUND

1. Technical Field

The present invention relates to a drive circuit of an electro-optical device such as a liquid crystal display, a driving method of the electro-optical device, and an electro-optical device having the drive circuit.

2. Related Art

A liquid crystal display is an example of an electro-optical device. An inversion driving method such as a dot inversion type, a line inversion type, and a surface inversion type is employed for driving the liquid crystal display. The respective inversion driving methods have advantages and disadvantages. The dot inversion type or the line inversion type has an advantage that crosstalk can be suppressed, but has a disadvantage that since potentials with inverse polarities are applied to neighboring pixel electrodes, a transverse electric field is generated between neighboring pixels. Since the transverse electric filed disturbs the alignment of liquid crystal molecules and thus causes the leakage of light, the transverse electric field is an important factor for deterioration in display quality such as decrease in contrast ratio or decrease in aperture ratio. Accordingly, in the future tendency of decrease in pitch, the surface-inversion type driving method little affected by the transverse electric field is advantageous.

On the other hand, the surface-conversion type driving method has another disadvantage. That is, in the surface inversion type, since positive-polarity fields (or positive-polarity frames) and negative-polarity fields (or negative-polarity frames) are asymmetrical regardless of the magnitude of an applied voltage with intermediate potentials, a flicker with a field cycle (or a frame cycle) occurs. In addition, paying attention to any one data line, if a cycle of inverting polarities is one field in all the pixels to be supplied with signals from the corresponding data line, image signals with the same polarity are written in a predetermined field. Then, in the next field, the polarity of the image signals to be supplied to the corresponding data line is inverted. At this time, since a display area is scanned from the upside to the downside, the polarity of the image signals to be supplied to the data line is equal to that of a sustained signal potential during a most sustain period after having written the image signals in the upper pixel side of the display area. On the contrary, the image signals with the polarity opposite to that of the sustained signal potential are supplied to the data line during the most sustain period after having written the image signals in the lower pixel side. In this way, when the upper pixel side and the lower pixel side of the display area are different in influence of the potential of the data line on pixel electrodes, electric charges may be leaked from the pixels at one side of the display area, thereby not accomplishing a proper display. For example, display brightness may be vertically deviated or a black image may seem to have a shadow.

In order to secure uniformity in image quality, for example, there has been suggested a technique, which is disclosed in JP-A-5-313608, that one horizontal scanning period is divided into a first period and a second period, image signals are applied to pixel electrodes by supplying driving pulses to the scanning lines and supplying the image signals to the data lines in the first period, and the image signals with the polarity opposite to the previous polarity are supplied to the data lines without supplying the driving pulses to the scanning lines in the second period.

Such studies for temporarily and spatially reducing display noises occurring during operation have been made in other inversion types other than the surface inversion type. For example, a driving method is disclosed in JP-A-10-253939, in which a scanning speed is increased to double, the same image signals are written to two lines while inverting the image signals in the same polarity pattern in a horizontal scanning period, and the writing lines is changed line by line every field, for interpolation of signals when interlace signals of an NTSC method, etc. are displayed in a non-interlace manner. In the technique, since DC components remain in the pixel portions due to the writing of the image signals with the same polarity to the same line in two neighboring fields, the polarity inversion pattern is further controlled to reduce the display noises due to the DC components.

However, the technique disclosed in JP-A-5-313608 has a disadvantage in that the time usable for the writing operation is reduced to half a normal time and thus the writing operation is not sufficiently carried out. In addition, in the technique disclosed in JP-A-10-253939, the flicker, etc. can be made to be invisible, but another study is required to reduce the noise components and thus to radically improve the display quality. The above-mentioned disadvantages are not limited to the liquid crystal display, but may be fundamentally caused in any electro-optical device employing the polarity-inversion driving method.

SUMMARY

An advantage of the present invention is to provide a drive circuit of an electro-optical device which can display an image with high quality and can accomplish decrease in pitch, a driving method of the electro-optical device, and an electro-optical device having the drive circuit.

According to an aspect of the present invention, there is provided a drive circuit for driving an electro-optical device that includes a plurality of data lines and a plurality of scanning lines extending to intersect each other and a plurality of pixel portions which are connected to the data lines and the scanning lines and which constitute a display surface, the drive circuit comprising: a scanning-line driving unit that supplies pulse signals to the plurality of scanning lines; and a data-line driving unit that supplies image signals to the plurality of data lines, wherein the scanning-line driving unit and the data-line driving unit drive, in a surface inversion manner, 2M (where M is a natural number) partial surfaces that result from dividing the display surface by an imaginary division line that extends in a direction in which the scanning lines extend, each partial surface including n (where n is a natural number greater than or equal to 2) scanning lines, the scanning-line driving unit and the data-line driving unit drive the pixel portions in an odd partial surface of the 2M partial surfaces, with respect to a direction in which the data lines extend, at a first cycle and drive the pixel portions in an even partial surface of the 2M partial surfaces in a second cycle that is complementary to the first cycle, and wherein the scanning-line driving unit includes: a shift register that simultaneously outputs a transmission signal to select one scanning line in both of the odd and even partial surfaces, and an output control section that enables a single one of scanning lines of the odd and even partial surfaces that were simultaneously selected by the transmission signal.

The drive circuit of an electro-optical device according to the invention employs, for example, an active matrix driving method is employed and writes data to the pixel portions by allowing the data-line driving unit to supply the image signals to a row of the pixel portions, which is selected by horizontally scanning the scanning lines with the scanning-line driving unit, through the data lines. The scanning-line driving unit and the data-line driving unit drive in the surface inversion manner to the 2M (where M is a natural number) partial surfaces resulting from dividing the display surface by division lines corresponding to the scanning lines, where each partial surface includes n (where n is a natural number greater than or equal to 2) scanning lines. At this time, the odd partial surfaces and the even partial surfaces have opposite polarities in each field period.

The "surface inversion manner" in the present invention means a driving method of inverting the polarities of the image signals when one picture is formed (in other words, when the image signals corresponding to one field are supplied) and corresponds to a surface-inversion type driving method having an inversion cycle of one field. However, in this case, the inversion cycle is not a field period based on the length of the image signals, but a display period for one picture. For example, when the same image is repeatedly written to display the image in one normal field period by performing the writing operation at a double speed, the polarities are inverted every time supplying the image signals corresponding to one field, even if the same signals are repeatedly supplied.

In this way, by performing the surface inversion every partial surface, it is possible to suppress occurrence of a transverse electric field in boundaries between lines which was a problem in a line-inversion type driving method, and it is also possible to suppress flickers, which was a problem in a normal surface-inversion type driving method of performing the surface inversion to the entire display area.

In addition, the drive circuit of an electro-optical device according to the invention alternately performs the horizontal scanning operation to the pixel portions in the odd partial surfaces and the pixel portions in the even partial surfaces. Here, if the scanning-line driving unit "alternately performs the horizontal scanning operation", it means that, for example, when the display surface is divided into two partial surfaces, the horizontal scanning operation is alternately performed to the two partial surfaces and that, for example, when the display surface is divided into four partial surfaces, the horizontal scanning operation is sequentially alternately performed to the four partial surfaces. That is, the writing operation of the image signals is simultaneously performed to the respective partial surfaces.

In order to specifically perform such an operation, the shift register simultaneously outputs the transmission signal to the scanning lines which are selected from the 2M partial surfaces, respectively, and the 2M enable signals having different enable periods are input to the shift register in response thereto. The 2M transmission signals and enable signals are input to the output control section and the pulse signals are output from the output control section on the basis of the transmission signals and the enable signals. For example, logical products are calculated and are output as the pulse signals. As a result, the 2M pulse signals are output to the 2M scanning lines in different periods corresponding to the enable periods.

In this way, the horizontal scanning operation is alternately performed to the positive-polarity partial surfaces and the negative-polarity partial surfaces. Accordingly, since the image signals to be supplied to the data lines are alternated and the potentials of the data lines are fluctuated between positive and negative polarities so as not to lean to any one polarity, the electric charges accumulated in the pixel portions are not affected. The inventors pays attention to that a DC component of the applied voltage in the data lines is a factor for leaking the accumulated charges and thus considers that the DC components do not overlap in the data lines, that is, that the image signals are alternated. Here, the polarity is inverted between the partial surfaces. Accordingly, for example, paying attention to a data line, when the image signal is written to the pixel portions in the upper partial surface with a negative polarity and to the pixel portions in the lower partial surface with a positive polarity, the image signal with a positive polarity is applied so as to perform the writing operation to the lower pixel portions, whereby the potential of the data line is positive and thus attracts the negative charges accumulated in the upper pixel portion. When the potential of the data line is greater than the potential due to the accumulated charges as well as when the polarities are opposite, the same is true relatively. That is, such a phenomenon frequently occurs within the same partial surface or between the partial surfaces with the same polarity.

Therefore, according to the invention, it is possible to prevent the leakage of accumulated charges and to satisfactorily suppress display noises, by driving the electro-optical device so as to solve the above-mentioned problems (that since the amount of leakage of accumulated charges in the lower part of a screen increases with increase in time when it is affected by potentials of the data lines, a vertical gradient in brightness occurs) and to exclude DC signal components.

Since the display surface is divided for use into the partial surfaces, at least two partial surfaces may be provided to correspond to positive and negative polarities, respectively. Rather, when the display surface is divided too finely, the boundaries where the transverse electric field is generated increases. Accordingly, it is preferable that the number of partial surfaces is small.

In the driving method according to the invention, since the occurrence of the transverse electric field is suppressed as much as possible, it is possible to maintain a high contrast ratio and to accomplish decrease in pitch. In addition, since the horizontal scanning operation is alternately performed to the areas where the polarities of the image signals to be written thereto at the time are different so as to alternate the polarities of the image signals, the image signals can be alternated, thereby preventing the leakage of accumulated charges and appropriately performing display of images.

In the drive circuit of an electro-optical device according to the invention, the output control section may include (i) an AND circuit receiving the 2M enable signals and having a complementary transistor in which any one of the 2M enable signals and the transmission signal are input to an input terminal thereof and (ii) an inverter circuit connected to an output terminal of the AND circuit.

In this case, the output control section includes the AND circuit and the inverter circuit. That is, the output control section has a logic circuit including the AND circuit and the inverter circuit. Among them, the AND circuit is a simple dual gate circuit having a complementary transistor. In this way, by employing the simple structure, the area for forming circuitry can be narrowed, thereby easily accomplishing decrease in pitch. In addition, the inverter circuit may be also constructed using a complementary transistor, similarly.

In the scanning-line driving unit, when the shift register outputs the transmission signal, a plurality of enable signals indicating different enable periods are input to the scanning-line driving unit. The transmission signal and the corresponding enable signal are input to the output control section and a logical product is obtained from the logic circuit having the AND circuit and the inverter circuit. As a result, a plurality of pulse signals are output to a predetermined scanning line in different periods corresponding to the enable periods.

In the drive circuit of an electro-optical device according to the invention, within an output period of the transmission signal from the shift register, the output control section may sequentially supply the pulse signals to the 2M scanning lines as targets to which the pulse signals should be input in the output period at input times of the 2M enable signals.

In this case, since the 2M scanning lines which are selected at a time are sequentially horizontally scanned, the writing operation is simultaneously performed to the 2M partial surfaces. In addition, since the 2M scanning lines which are selected at a time are scanned within the output period of the transmission signal, the electro-optical device can be driven at 2M times speed if the output period of the transmission signal corresponds to a normal horizontal scanning period.

In the drive circuit of an electro-optical device according to the invention, respective signal lines for the 2M enable signals may be disposed to extend between the display surface and the shift register and branch lines may be branched therefrom so as to correspond to the scanning lines which are selected from the 2M partial surfaces, respectively, and which have different arrangements in the respective partial surfaces.

In this case, the 2M enable signals are supplied to the 2M partial surfaces, respectively, and the combination of the scanning lines which are selected from the 2M partial surfaces which are targets for inputting signals, respectively, is different for each enable signal. Accordingly, by simultaneously outputting the transmission signal to the scanning lines to which the different enable signals have been input, it is possible to simultaneously scan the 2M partial surfaces by the use of the 2M enable signals. Here, the “branch lines” indicates 2M signal lines branched to extend corresponding to the 2M partial surfaces so as to supply the enable signal to the 2M partial surfaces, paying attention to any one enable signal. The 2M signal lines supply signals to the scanning lines having different arrangement positions in the respective partial surfaces.

In order to enable such an operation, since the 2M signal lines are provided all over the 2M partial surfaces, a bad effect such as variation in signal shape due to the length of the signal lines is prevented. Accordingly, by constructing the scanning-line driving circuit in this way, it is possible to appropriately drive the electro-optical device.

In the drive circuit of an electro-optical device according to the invention, the scanning-line driving unit and the data-line driving unit may continuously perform a writing operation of the image signals corresponding to one screen by n times with inversion of polarity every time within a display period corresponding to one screen.

In this case, the drive circuit is driven at a double speed and an image to be displayed in a field period is repeatedly written several times within the field period. As described above, predetermined image signals corresponding to a field are repeatedly displayed with inversion of polarities thereof within the field period.

In the surface-inversion type driving method, due to the difference in the amount of leakage depending upon the polarities of accumulated charges resulting from characteristics of a pixel switching thin film transistor (hereinafter, referred to as “TFT”), the potentials of the pixel electrodes may be varied every time when fields are changed. This phenomenon is recognized with naked eyes as periodical variation in brightness of 30 Hz corresponding to the field period, that is, flickers. Accordingly, when the variation in brightness is doubled, for example, to 60 Hz by increasing the driving speed to double, the frequency is sufficiently increased, thereby making the flickers invisible. As a result, it is possible to further enhance the display quality in this case.

In the case that the output control section includes the AND circuit and the inverter circuit, the scanning-line driving unit may perform the horizontal scanning operation to the pixel portions in each of the odd partial surfaces and the even partial surfaces or in the partial surfaces in a random order regardless of the order corresponding to the direction parallel to the data lines.

In this structure, the pixel portions to be scanned are alternately selected from the positive-polarity partial surface and the negative-polarity partial surfaces, but the scanning order of the pixel portions in a partial surface or for each polarity is random regardless of the order corresponding to the direction parallel to the data lines. In this way, even when the scanning order is random, it is possible to prevent the bad effect of the transverse electric field from appearing, by canceling or making uniform the occurrence of the transverse electric field between the pixel rows in the respective partial surfaces.

In the case that the output control section includes the AND circuit and the inverter circuit, a threshold voltage of the complementary transistor in the AND circuit may be smaller than a threshold voltage of an inverter in the inverter circuit.

In this structure, even when the threshold voltage of the internal transistor overlaps with the output “Low” of the AND circuit, the inverter circuit at the next stage recognizes it as “Low”. For example, the AND circuit according to the invention may output “Low”, since the transmission signal is not applied (that is, the applied voltage is 0V) at the time of turning on the transistor. Since the threshold voltage (for example, 1.5V) overlaps with the output, the signal output is not 0V but may be an effective value of, for example, 1.5V. However, when the threshold voltage of the inverter in the inverter circuit is greater than the effective value, the deviation of the Low voltage having such a degree can be neglected, thereby obtaining a normal logical output.

In the case that the output control section includes the AND circuit and the inverter circuit, the AND circuit and the inverter circuit may include a plurality of unit circuits corresponding to the plurality of scanning lines and the plurality of unit circuits may be formed in a plurality of unit areas which are disposed adjacent to the display surface and parallel to each other, respectively.

In this structure, the AND circuits and the inverter circuits include unit circuits corresponding to the scanning lines one by one. The respective unit circuits are formed in the unit areas adjacent to the display surface and are arranged to correspond to the scanning lines. As described above, since the AND circuits according to the invention have a simple structure, it can be embodied as such unit circuits and it is possible to satisfactorily cope with decrease in pitch by narrowing the width of the unit areas.

According to another aspect of the invention, there is provided an electro-optical device comprising the drive circuit (which includes various modifications) of an electro-optical device described above.

Since the electro-optical device according to the invention includes the drive circuit of an electro-optical device described above, it is possible to display an image with high quality and to accomplish the decrease in pitch. In addition, the electro-optical device can apply to a variety of electronic apparatuses such as a transmissive display, a liquid crystal television, a mobile phone, an electronic pocketbook, a word processor, a video tape recorder of a view finder type or a monitor direct view type, a work station, a television phone, a POS terminal, and a touch panel. Otherwise, for example, an electrophoresis device such as an electronic paper, a display employing an electro emission element (Field Emission Display and Surface-Conduction Electron-Emitter Display) can be embodied using the electro-optical device according to the invention.

According to another aspect of the present invention, there is provided a driving method of driving an electro-optical device that includes a plurality of data lines and a plurality of scanning lines extending to intersect each other and a plurality of pixel portions which are connected to the data lines and the scanning lines and which constitute a display surface. The driving method comprises: driving in a surface inversion manner with a first cycle the pixel portions in odd partial surfaces in a direction parallel to the data lines among 2M (where M is a natural number) partial surfaces resulting from dividing the display surface by division lines corresponding to the scanning lines, each partial surface including n (where n is a natural number greater than or equal to 2) scanning lines, and driving the pixel portions in even partial surfaces among the 2M partial surfaces in the surface inversion manner with a second cycle complementary to the first cycle, and alternately performing a horizontal scanning operation to the pixel portions in the odd partial surfaces and a horizontal scanning operation to the pixel portions in the even partial surfaces, by simultaneously outputting a transmission signal to the scanning lines which are selected from the 2M partial surfaces, respectively, outputting 2M enable signals indicating different enable periods, and outputting the pulse signals on the basis of the enable signals and the transmission signal.

In the driving method of an electro-optical device according to the invention, similarly to the drive circuit of an electro-optical device according to the invention described above, the surface inversion type driving operation is performed to each partial surface, which is obtained by dividing the display surface into approximately like sizes. At this time, the neighboring partial surfaces have opposite polarities in each field period.

In the driving method of an electro-optical device according to the invention, similarly to the drive circuit of an electro-optical device described above, by performing the surface inversion every partial surface, it is possible to suppress occurrence of a transverse electric field in boundaries between lines, which was a problem in a line-inversion type driving method, and it is also possible to suppress flickers which were a problem in a normal surface-inversion type driving method of performing the surface inversion to the entire display area.

Further, in the driving method of an electro-optical device according to the invention, by simultaneously outputting the transmission signal to the scanning lines which are selected from the 2M partial surfaces, respectively, outputting 2M enable signals indicating different enable periods, and outputting the pulse signals on the basis of the enable signals and the transmission signal, for example, outputting logical products of the enable signals and the transmission signal as the pulse signals, the horizontal scanning operation to the pixel portions in the odd partial surfaces and the horizontal scanning operation to the pixel portions in the even partial surfaces are alternately performed.

In this case, since the horizontal scanning operation is alternately performed to the pixel portions in the odd partial surfaces and the pixel portions in the even partial surfaces, it is possible to prevent the leakage of accumulated charges and to satisfactorily suppress display noises, by driving the electro-optical device so as to solve the above-mentioned problems (that since the amount of leakage of accumulated charges in the lower part of a screen increases with increase in time when it is affected by potentials of the data lines, a vertical gradient in brightness occurs) and to exclude DC signal components.

In the driving method of an electro-optical device according to the present invention, a logical product may be output as the pulse signal, by the use of (i) an AND circuit having a complementary transistor in which any one of the 2M enable signals and the transmission signal are input to an input terminal thereof and (ii) an inverter circuit connected to an output terminal of the AND circuit.

In this case, similarly to the case that the output control section in the drive circuit of an electro-optical device according to the invention includes the AND circuit and the inverter circuit, the logical product is obtained from the logic circuit including the AND circuit and the inverter and thus a plurality of pulse signals are output to a predetermined scanning line in different periods corresponding to the enable periods.

These operations and other advantages of the present invention will become apparent from exemplary embodiments of the present invention described below.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, exemplary embodiments of the present invention will be described with the accompanying drawings. In the exemplary embodiments, an electro-optical device according to the present invention is applied to a liquid crystal display.

1. First Embodiment

First, an electro-optical device according to a first embodiment of the present invention will be described with reference to FIGS. 1 to 15.

1-1. Structure of Electro-optical Device

Figure 1:
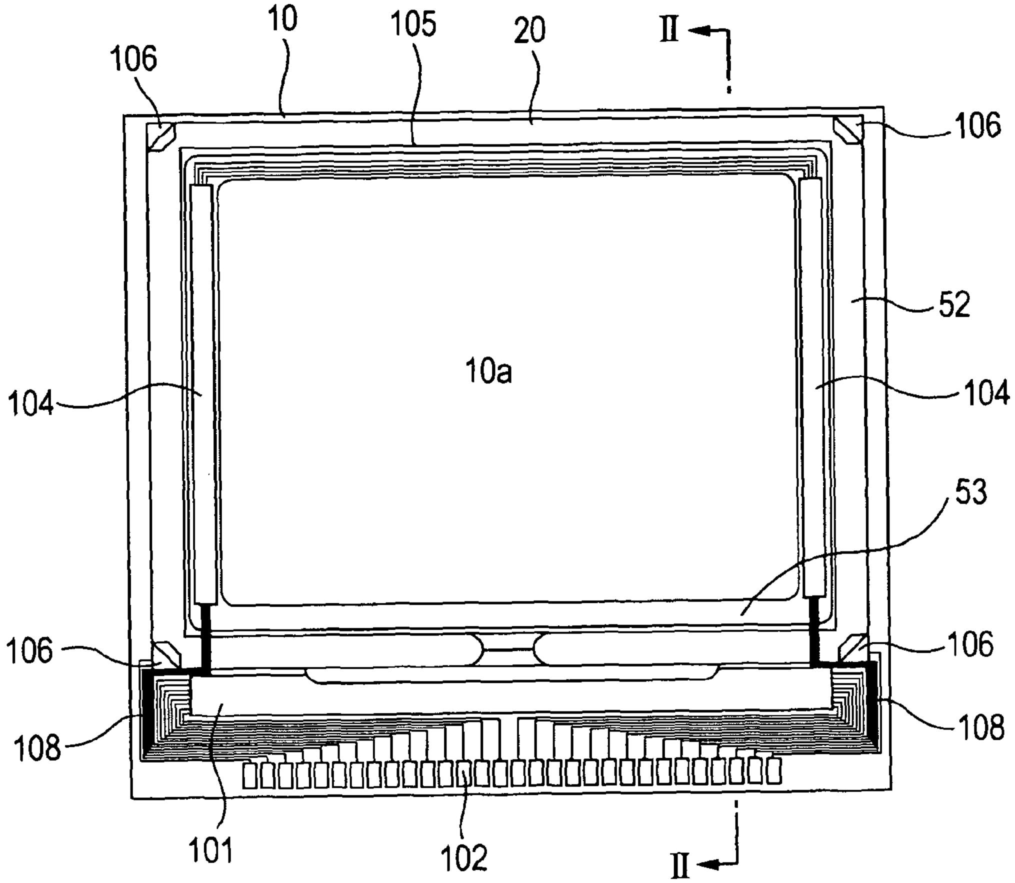
FIG. 1 is a plan view illustrating the entire structure of an electro-optical device.
Figure 2:
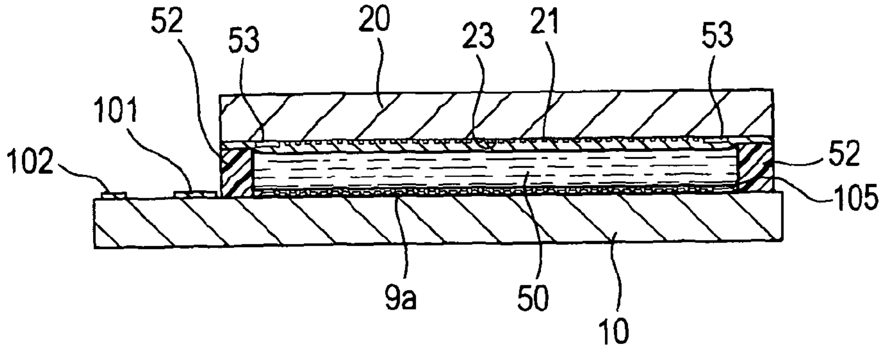
FIG. 2 is a cross-sectional view taken along Line II-II of FIG. 1.
Figure 3:
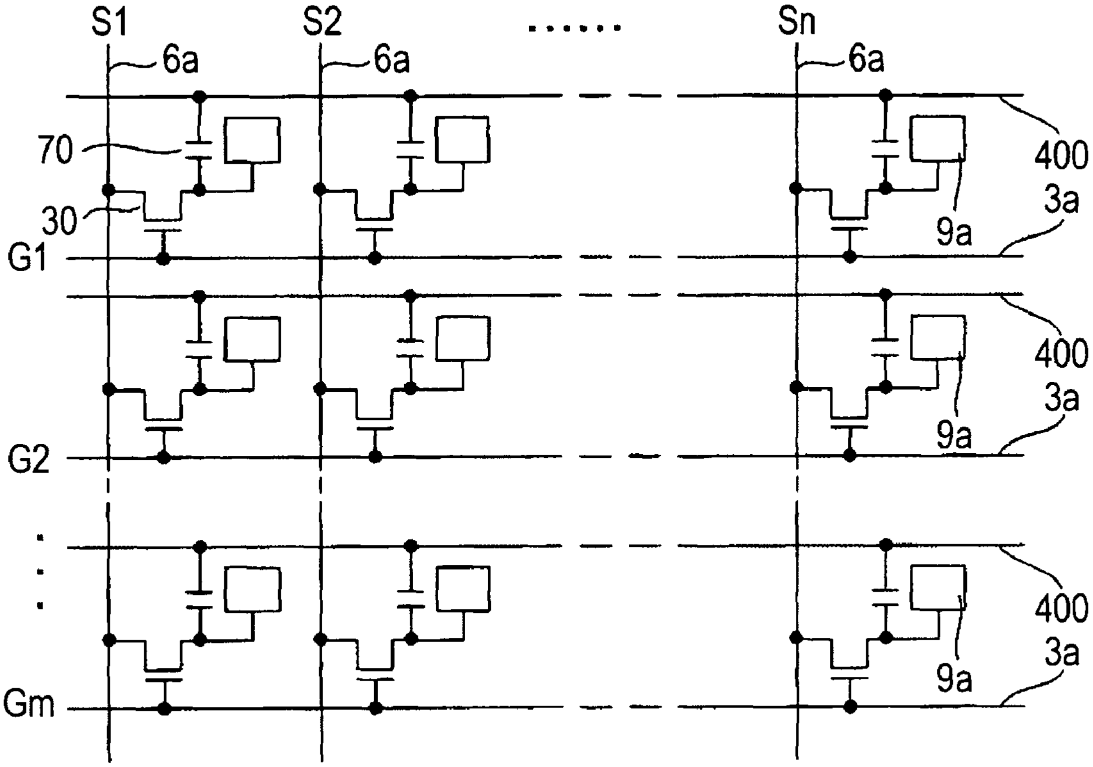
FIG. 3 is an equivalent circuit diagram illustrating a variety of elements and lines in a plurality of pixel portions which are formed in a matrix shape and constitute an image display area of the electro-optical device.
Figure 4:
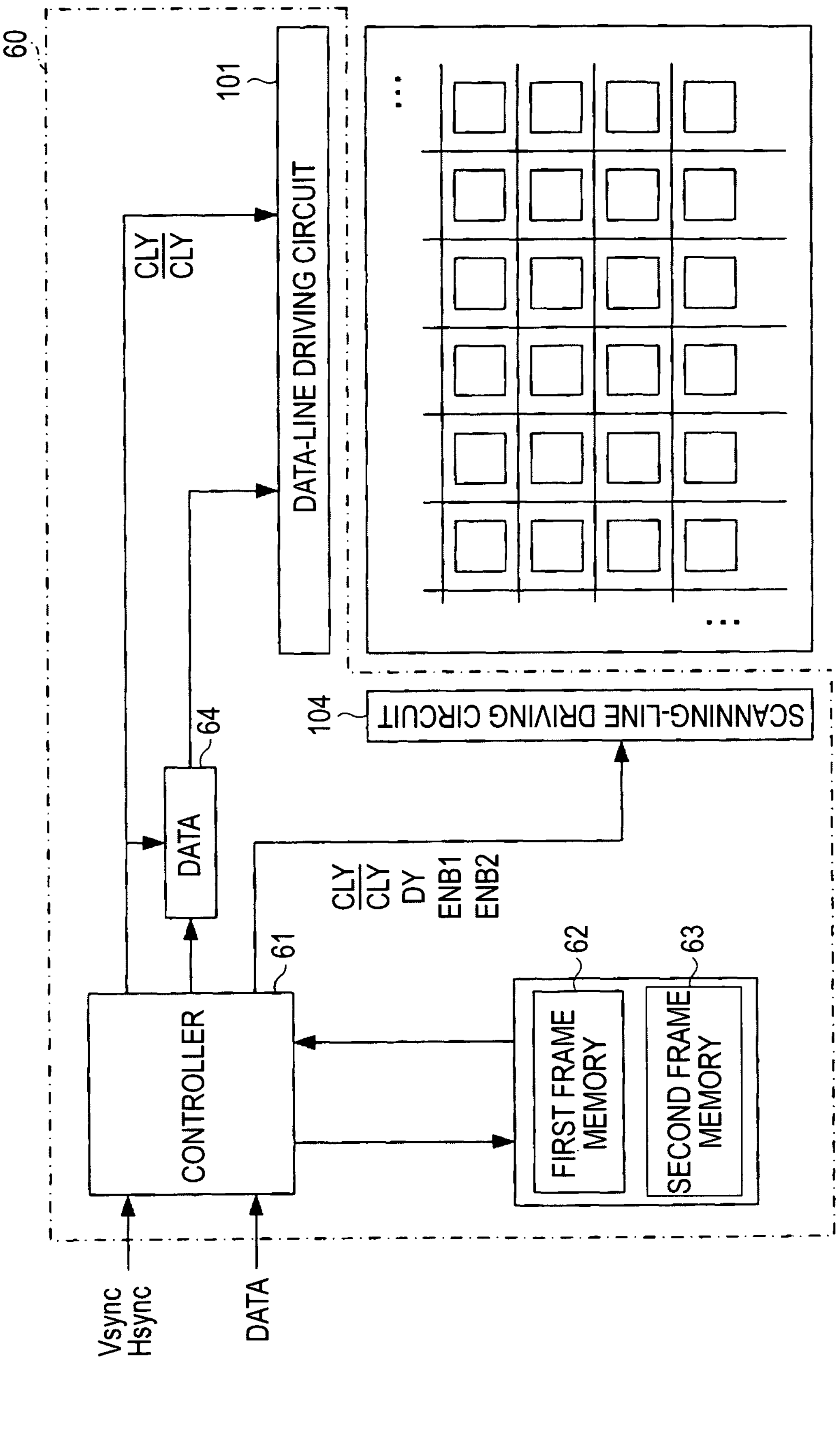
FIG. 4 is a block diagram illustrating a structure of a drive system of the electro-optical device according to a first embodiment.

A structure of the electro-optical device according to the first embodiment will be first described with reference to FIGS. 1 to 4. FIG. 1 is a plan view of the electro-optical device in which a TFT array substrate having elements formed thereon is seen from a counter substrate side and FIG. 2 is a cross-sectional view taken along II-II of FIG. 1. FIG. 3 is an equivalent circuit diagram of pixel portions in the electro-optical device according to the first embodiment and FIG. 4 is a block diagram illustrating a drive circuit unit.

Referring to FIGS. 1 and 2, in the electro-optical device according to the first embodiment, a TFT array substrate 10 and a counter substrate 20 are opposed to each other. A liquid crystal layer 50 is sealed between the TFT array substrate 10 and the counter substrate 20. The TFT array substrate 10 and the counter substrate 20 are bonded to each other with a seal member 52 provided in a sealing area around an image display area 10*a*.

The seal material 52 is made of ultraviolet curable resin or thermosetting resin for bonding both substrates. The seal member is applied onto the TFT array substrate 10 during a manufacturing process and then is cured by irradiation of ultraviolet rays or application of heat. A gap material such as glass fibers or glass beads for setting a gap (inter-substrate gap) between the TFT array substrate 10 and the counter substrate 20 to a predetermined value is dispersed in the seal member 52. That is, the electro-optical device according to the first embodiment can be used as a light valve of a projector and is suitable for enlarged display by the use of a small size.

A frame light-shielding layer 53 defining a frame area of the image display area 10*a* is formed on the counter substrate 20 to be parallel to the inside of the seal area in which the seal member 52 is disposed. However, all or a part of the frame light-shielding layer 53 may be provided as a built-in light-shielding layer on the TFT array substrate 10.

Outside of the area in which the seal member 52 is disposed in a peripheral area around the image display area 10*a*, a data-line driving circuit 101 and external circuit connection terminals 102 are disposed along a side of the TFT array substrate 10. Scanning-ling driving circuits 104 are disposed along two sides adjacent to the side, wherein the scanning-line driving circuits are covered with the frame light-shielding layer 53. In order to connect the two scanning-line driving circuits 104 disposed on both sides of the image display area 10*a*, a plurality of wires 105 are disposed along the remaining side of the TFT array substrate 10, wherein the plurality of wires 105 are covered with the frame light-shielding layer 53.

Vertical electrical connection members 106 serving as vertical electrical connection terminals between both substrates are disposed at four corners of the counter substrate 20. On the other hand, vertical electrical connection members are provided in areas of the TFT array substrate 10 opposed to the corners. Accordingly, electrical connection between the TFT array substrate 10 and the counter substrate 20 can be accomplished.

In FIG. 2, pixel electrodes 9*a* and an alignment layer are sequentially formed on pixel switching TFTs or various wires on the TFT array substrate 10. On the other hand, in addition to a counter electrode 21, a light-shielding layer 23 having a lattice shape or a stripe shape and an alignment layer are sequentially formed on the counter substrate 20. The liquid crystal layer 50 includes, for example, a liquid crystal including a kind of nematic liquid crystal or a liquid crystal obtained by mixing various nematic liquid crystals, and has a predetermined alignment state between the pair of alignment layers.

In addition to the data-line driving circuit 101 and the scanning-line driving circuits 104, a sampling circuit sampling the image signals of the image signal lines and supplying the sampled image signals to the data lines, a precharge circuit supplying a precharge signal with a predetermined voltage level to the data lines prior to supplying the image signals, an inspection circuit inspecting quality and defects of the electro-optical device during manufacturing or at the time of shipping, and the like may be formed on the TFT array substrate 10.

As shown in FIG. 3, in the image display area 10*a*, a plurality of scanning lines 3*a* and a plurality of data lines 6*a* are arranged to intersect each other and pixel portions which are selected by the respective ones of the scanning lines 3*a* and the data lines 6*a* are disposed between the scanning lines and the data lines. Each pixel portion is provided with a TFT 30, a pixel electrode 9*a*, and a storage capacitor 70. The TFT 30 serves to supply the image signals S1, S2, . . . , Sn from the data lines 6*a* to the selected pixel. The gate of the TFT is connected to the corresponding scanning line 3*a*, the source is connected to the corresponding data line 6*a*, and the drain is connected to the corresponding pixel electrode 9*a*. The pixel electrode 9*a* forms a liquid crystal capacitor together with a counter electrode 21 to be described later and serves to input the image signals S1, S2, . . . , Sn to the pixel portions and to sustain the input image signals for a predetermined period of time. One pixel electrode of the storage capacitor 70 is connected to the drain of the TFT 30 in parallel to the pixel electrode 9*a* and the other electrode is connected to a capacitor line 400 with a fixed potential so as to have a constant potential.

The electro-optical device employs, for example, a TFT active matrix driving method. In the electro-optical device, the scanning-line driving circuit 104 (see FIG. 1) supply scanning signals G1, G2, . . . , G2*m* to the respective scanning lines 3*a* in the order described later and the data-line driving circuit 101 (see FIG. 1) supplies the data signals S1, S2, . . . , Sn to the selected horizontal line of pixel portions in which the TFT 30 is accordingly turned on through the data lines 6*a*. At this time, the data signals S1, S2, . . . , Sn may be supplied to the data lines 6*a* in a line sequential manner and may be supplied to the data lines 6*a* (for example, every group) at the same time. Consequently, the image signals are supplied to the pixel electrodes 9*a* corresponding to the selected pixels. Since the TFT array substrate 10 is opposed to the counter substrate 20 with the liquid crystal layer 50 therebetween (see FIG. 2), an electric field is applied to the liquid crystal layer 50 in the respective pixel areas partitioned and arranged as described above and thus the amount of light passing through both substrates is controlled every pixel area. As a result, an image is displayed in gray scales. At this time, the image signals sustained in the respective pixel areas are prevented from leaking by the storage capacitor 70.

As shown in FIG. 4, a driving circuit unit 60 of the electro-optical device according to the first embodiment includes a controller 61, a first frame memory 62, a frame memory corresponding to two pictures in a second frame memory 63, and a DA converter 64, in addition to the data-line driving circuit 101 and the scanning-line driving circuit 104. A vertical synchronization signal Vsync, a horizontal synchronization signal Vsync, and an image signal DATA are input to the controller 61. The controller 61 serves to control operation times of the respective elements based on the vertical synchronization signal Vsync and the horizontal synchronization signal Hsync, to control the writing and reading operations of the first frame memory 62 and the second frame memory 63, and to output the image signal DATA corresponding to the scanning lines 3*a* to be written to the DA converter 64 from the frame memory. The first frame memory 62 and the second frame memory 63 serve to temporarily store the image signal DATA, which corresponds to one frame and is input externally, in one side thereof and to output the stored image signal DATA for display from the other side, every frame. The DA converter 64 serves to convert the image signal DATA read out from the frame memory in a digital-to-analog manner and to output the converted image signal to the data-line driving circuit 101. The data-line driving circuit 101 supplies the data signal Sx to the corresponding data lines 6*a* as an output based on the input signal.

Although details are described later, the scanning-line driving circuit 104 serves to basically perform a horizontal scanning in a line-sequential manner in response to a clock signal CLY and an inverted clock signal CLY' from the controller 61. Here, since two start pulses are simultaneously generated and output from one driving circuit and enable signals ENB1 and ENB2 for deviating the output times of the scanning signals are input to the scanning-line driving circuit, a driving method of supplying the scanning signals Gx to the scanning lines 3*a* in the order described later can be utilized.

1-2. Driving Method of Electro-optical Device

Figure 5:
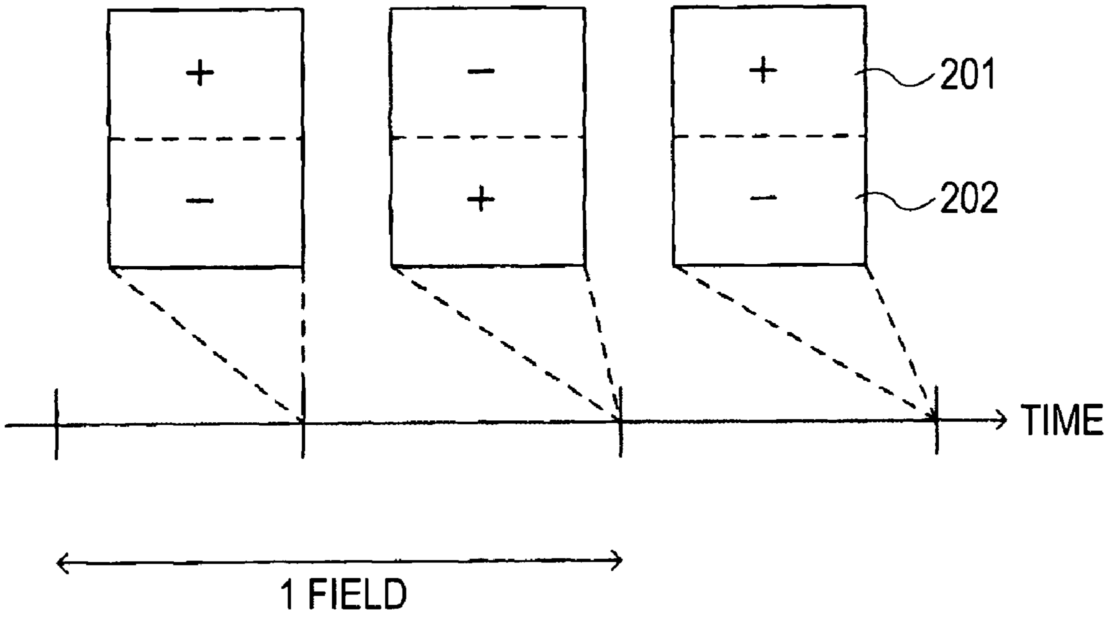
FIG. 5 is a diagram illustrating a driving method of the electro-optical device according to the first embodiment.
Figure 6:
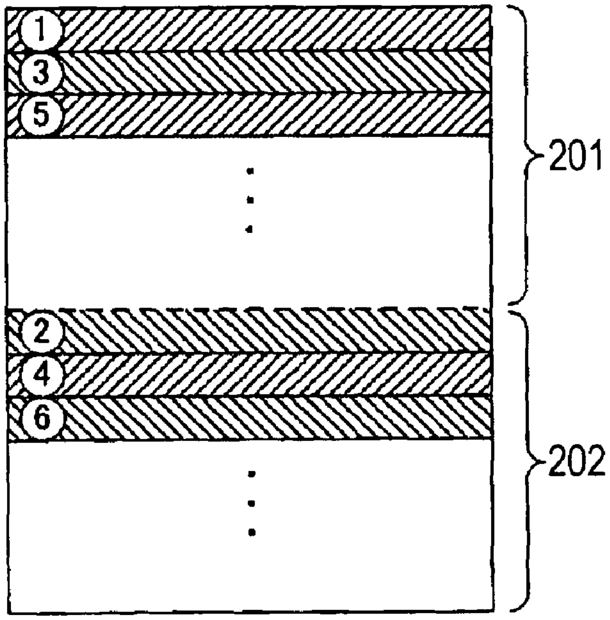
FIG. 6 is a diagram illustrating the driving method of the electro-optical device according to the first embodiment.
Figure 7:
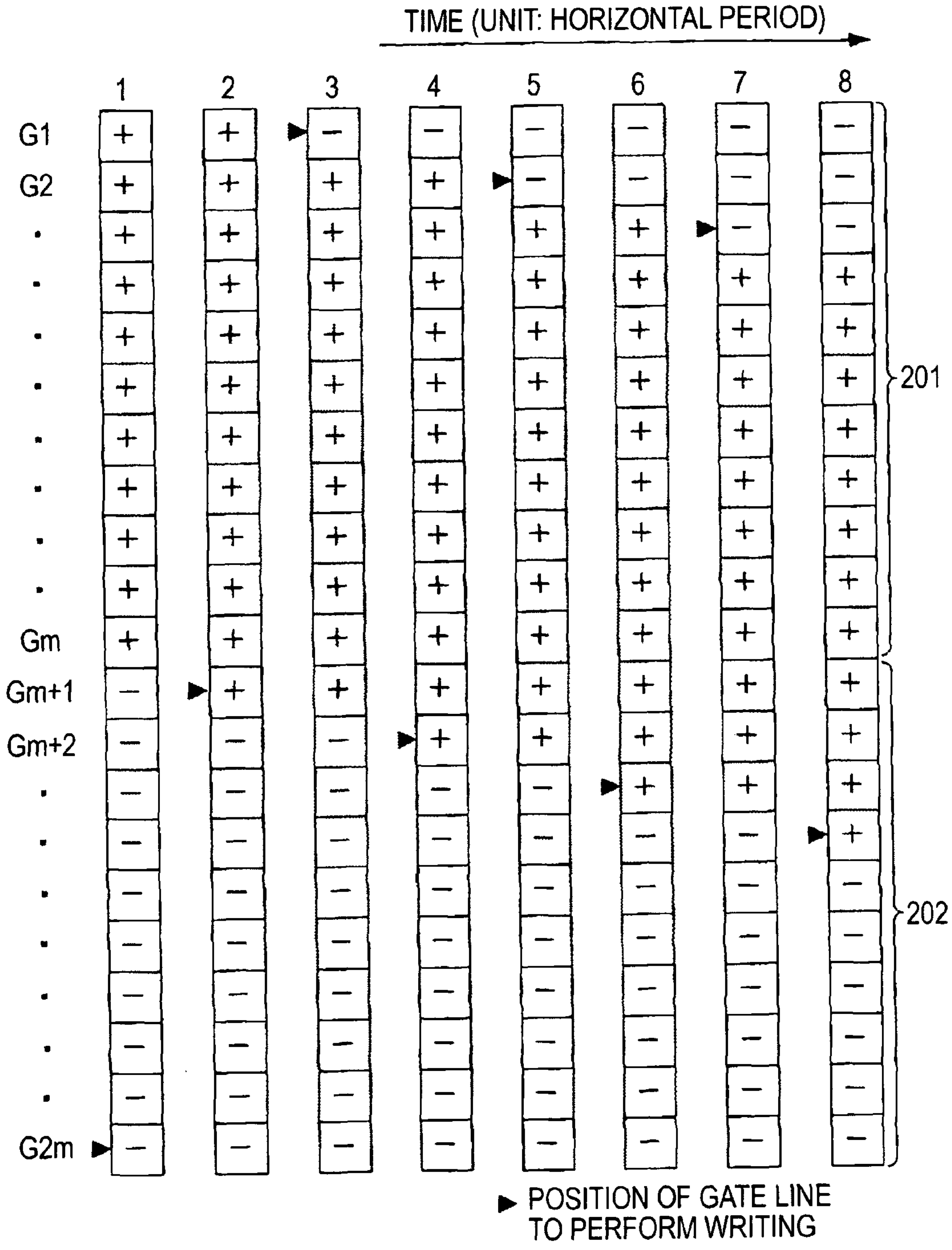
FIG. 7 is a diagram illustrating the driving method of the electro-optical device according to the first embodiment.
Figure 8:
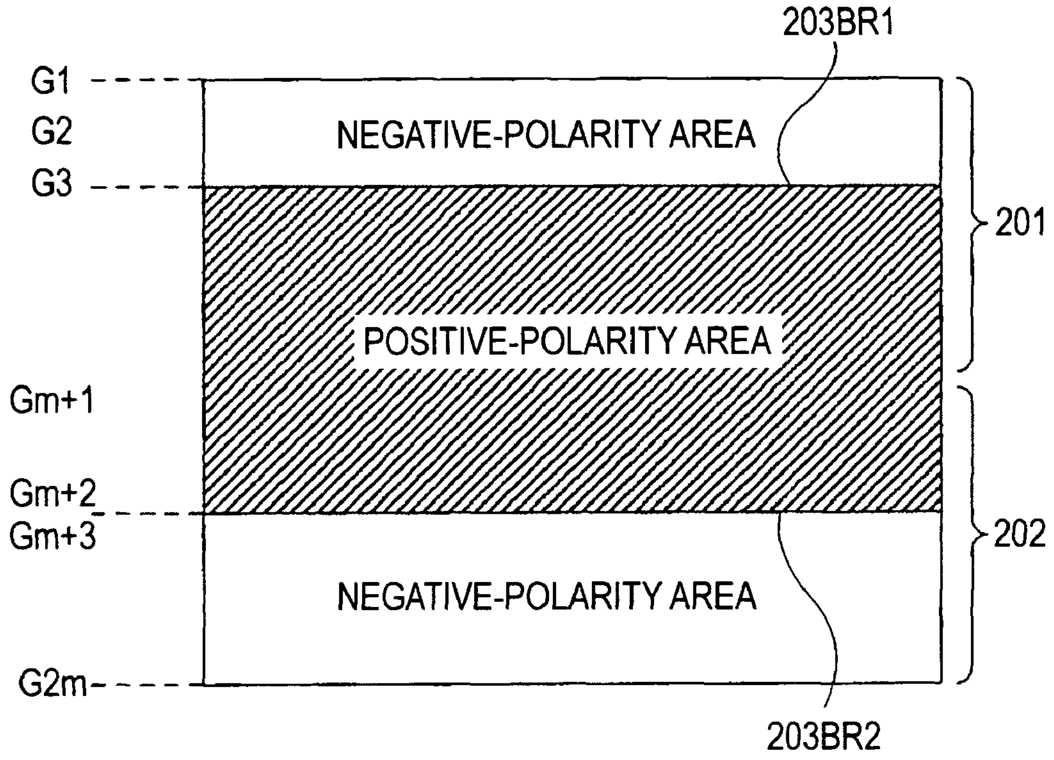
FIG. 8 is a diagram illustrating the driving method of the electro-optical device according to the first embodiment.
Figure 9:
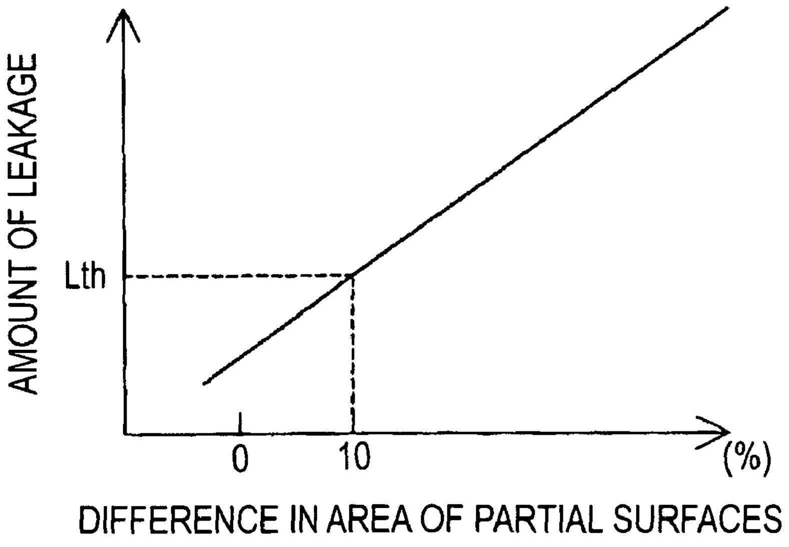
FIG. 9 is a diagram illustrating the driving method of the electro-optical device according to the first embodiment.

Next, a driving method of the above-mentioned electro-optical device will be described with reference to FIGS. 5 to 9. FIGS. 5 and 6 are diagrams conceptually illustrating a driving method according to the first embodiment. FIG. 7 shows change in polarity on a screen with the lapse of time and FIG. 8 shows an instantaneous image of the screen in any one horizontal period. FIG. 9 shows variation in amount of leaked charges in the pixel portions with respect to difference in area between the areas which are driven with complementary polarities.

In the first embodiment, as shown in FIG. 5, the pixel portions of two partial surfaces 201 and 202 which are obtained by vertically dividing a screen in the same size are driven in cycles complementary to each other in a field inversion manner as an example of the "surface inversion type driving" according to the present invention. Here, it is supposed that the cycles are a half field. That is, the scanning-line driving circuit 104 and the data-line driving circuit 101 are driven at a double speed and the writing operation of the data signal Sx to the partial surfaces 201 and 202 is performed to correspond to two pictures in a field period. Specifically, one filed data piece is divided into two field data pieces of first and second field data pieces having different polarities, the two field data pieces are shifted by a half vertical period, and then the two field data pieces are overwritten. This can be carried out by using the frame memories 62 and 63. At this time, the data-line driving circuit 101 inverts the polarity of the data signal Sx with a half field cycle to make the polarity of the data signal Sx be different in the partial surface 201 and the partial surface 202 of a screen.

As shown in FIG. 6, the horizontal scanning of the respective pictures are performed alternately in the pixel portions of the partial surface 201 and the pixel portions of the partial surface 202. That is, the writing operation of the data signal Sx is performed alternately to the partial surfaces 201 and 202. This state is shown in FIG. 7 with the lapse of time.

In FIG. 7, for example, in a first horizontal period, the 2m-th scanning line 3*a* is scanned with a scanning signal G2*m* and a data signal Sx with a negative potential is written to the corresponding pixel portions. In a second horizontal period, the (m+1)-th scanning line 3*a* is scanned with a scanning signal Gm+1 and a data signal Sx with a positive potential is written to the pixel portions which have had a negative potential in the first horizontal period. In a third horizontal period, the first scanning line 3*a* is canned with a scanning signal G1 and a data signal Sx with a negative potential is written to the pixel portions which have had the positive potential in the first and second horizontal periods. Thereafter, such a selective writing operation is repeated. Accordingly, when a half of a screen, that is, the partial surface 201 or 202, has been completely scanned, the positive-polarity area and the negative-polarity area are completely inverted and thus a rewriting operation corresponding to one screen has been performed. According to this method, when the entire screen is scanned, the rewriting operation is performed two times and consequently a vertical period for the input image signal is reduced to a half.

As a result, as shown in FIG. 8, paying attention to any one horizontal period, for example, a screen is divided into a positive-polarity area and a negative-polarity area in the manner that the pixel portions scanned with the scanning signals G3 to Gm+2 are an area (hereinafter, simply referred to as negative-polarity area) to which data with a positive potential are written and the pixel portions scanned with the scanning signals G1 to G2 and Gm+3 to G2*m* are an area to which data with a negative potential are written.

In FIG. 8, the boundaries 203BR1 and 203BR2 between the positive-polarity areas and the negative polarity areas are moved from the upside to the downside in a screen with the vertical scanning operation from the upside to the downside. That is, since the boundaries 203BR1 and 203BR2 in which image quality is deteriorated due to a transverse electric field are not fixed to a constant position but are vertically moved in the screen, the deterioration in image quality due to the transverse electric field is almost invisible.

In this way, in the first embodiment, the positive-polarity areas and the negative polarity areas having half an area of the screen are inverted in a vertical period and the surface inversion type driving operation is performed to the partial surface 201 and the partial surface 202. In the vertical period, since the neighboring pixel portions have opposite polarities for the time of 2/2m but have the same polarity for the most remaining time of (2m−2)/2m, the alignment failure in the liquid crystal layer 50 due to the transverse electric field are little generated.

On the other hand, since the signal polarity of the data lines 6a is inverted in the partial surface 201 and the partial surface 202, large difference in the amount of charges leaked from the TFTs 30 does not occurs n the upper portion and the lower portion of the screen unlike the case where the surface inversion type driving method is employed in the related art, thereby avoiding non-uniformity in display depending upon the positions of the screen.

Here, since the horizontal scanning operation is alternately performed to the positive-polarity partial surface and the negative-polarity partial surface, the data signals Sx supplied to the data lines 6a are alternated. Accordingly, since the potentials of the data lines 6a always alternate between a positive polarity and a negative polarity and are not deviated to any polarity, it is possible to reduce the possibility of leaking the electric charges accumulated in the storage capacitors 70 of the pixel portions.

Accordingly, it is preferable that the areas of the positive-polarity area and the negative-polarity area, that is, the areas of the partial surface 201 and the partial surface 202, are approximately equal to each other. It is actually preferable that the difference in area between both areas is less than 10% in the area ratio. FIG. 9 shows an amount of charge leakage from the pixel portions with respect to the difference in area between the areas which are driven with polarities complementary to each other. As can be seen from FIG. 9, the amount of leaked charges increases in proportion to the magnitude of area difference between the areas having different polarities. When the amount of charge leakage is greater than a threshold value Lth, flickers of the screen are visible. If the amount of charge leakage is suppressed less than the threshold value Lth, it means that the difference in area is suppressed less than 10% and the image signal is alternated.

In the first embodiment, since the scanning frequency is 100 Hz which is double the frequency of the input image signal, it is possible to satisfactorily suppress the flickers which can be recognized by human eyes.

Next, a specific unit for embodying the driving method will be described with reference to FIGS. 10 to 15.

Figure 10:
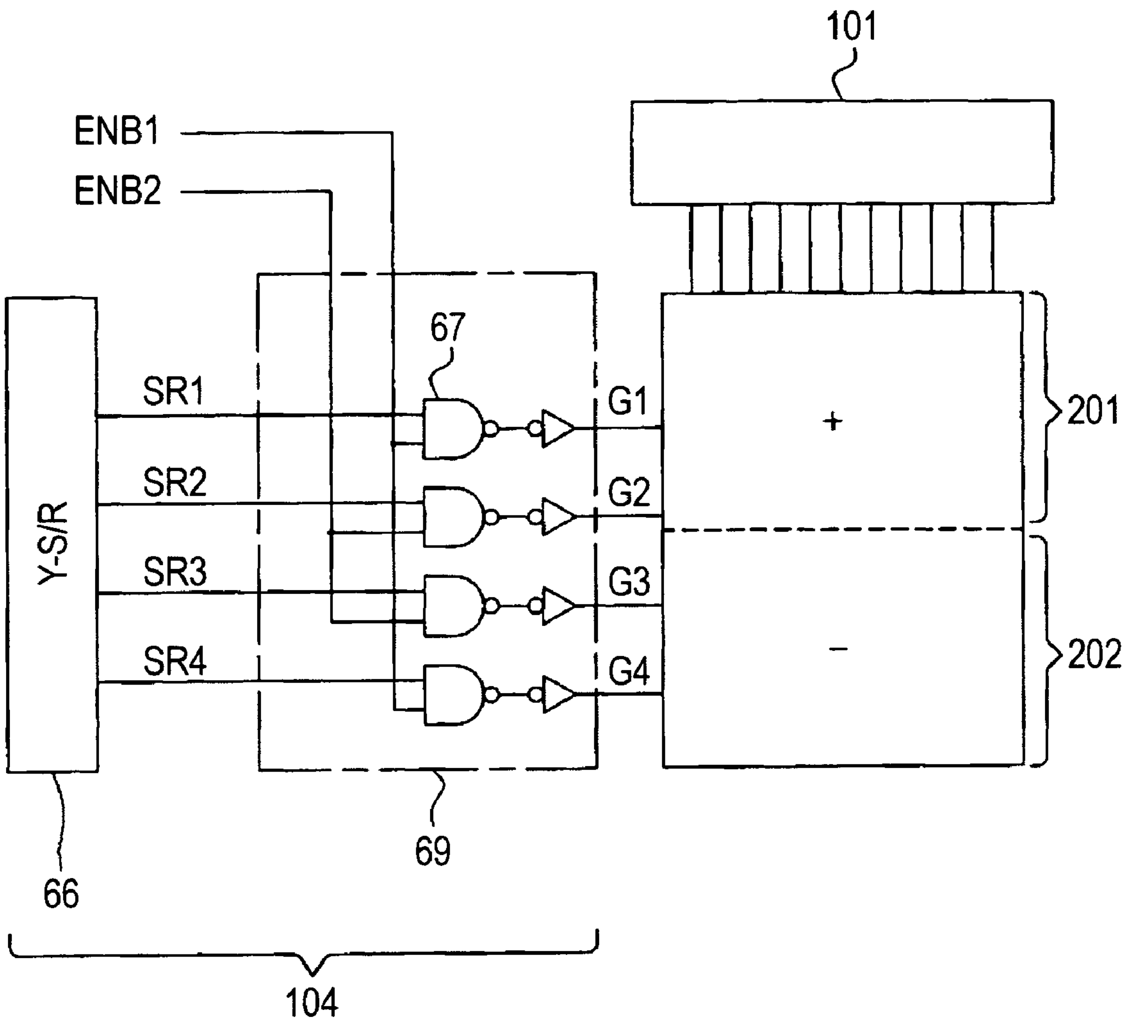
FIG. 10 is a circuit diagram illustrating the specific structure of a drive circuit of an electro-optical device according to the first embodiment.
Figure 11:
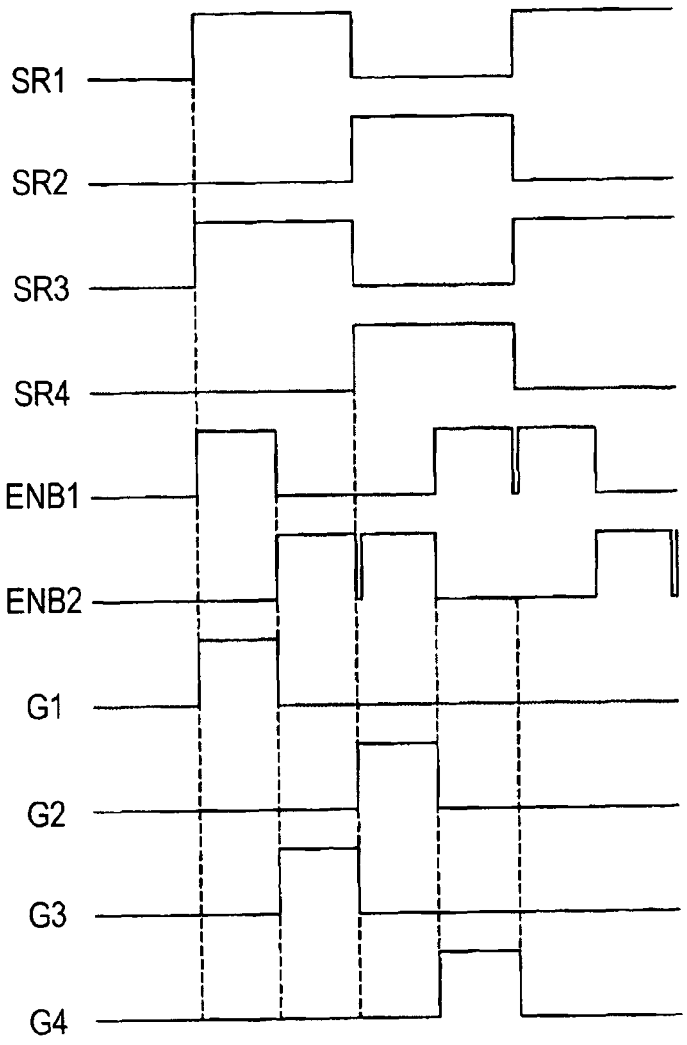
FIG. 11 is a timing diagram illustrating the driving method of the electro-optical device according to the first embodiment.
Figure 12:
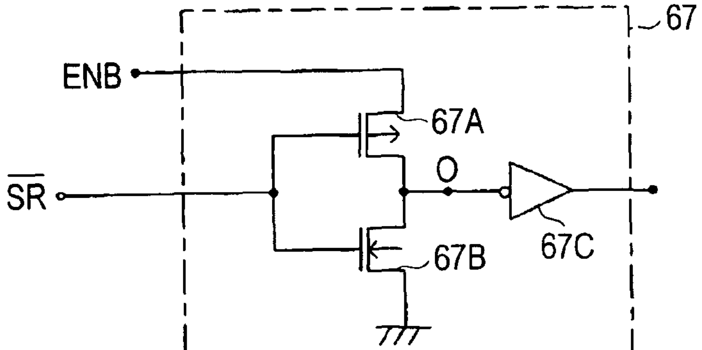
FIG. 12 is a circuit diagram illustrating the specific structure of a NAND circuit provided in the drive circuit shown in FIG. 10.
Figures 13, 14:
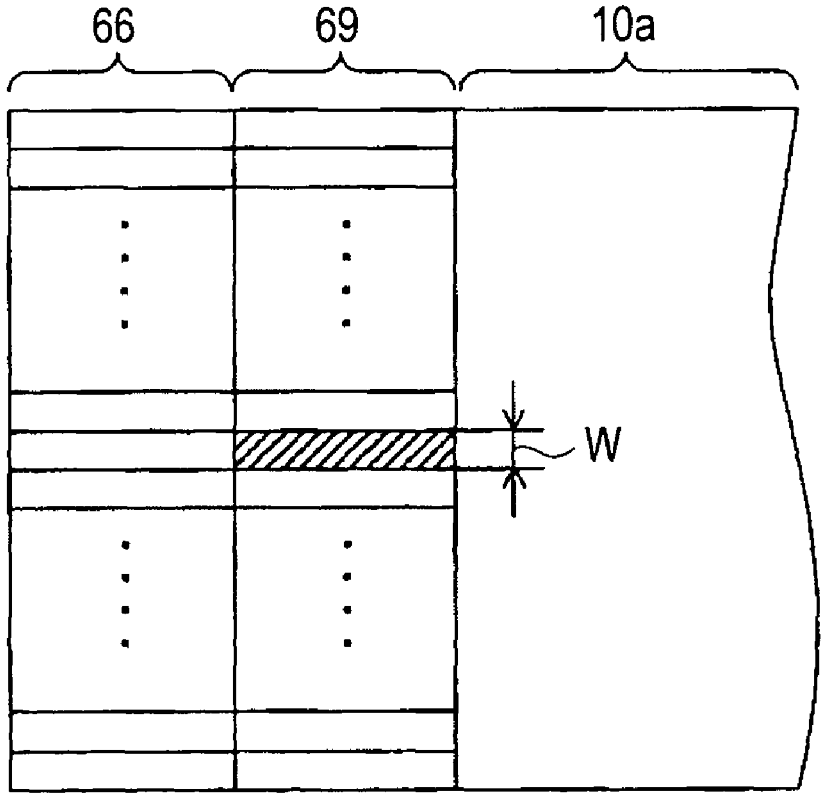
FIG. 13 is a truth table of the NAND circuit shown in FIG. 12.
FIG. 14 is a diagram illustrating a specific circuit layout of the drive circuit shown in FIG. 10.
Figure 15:
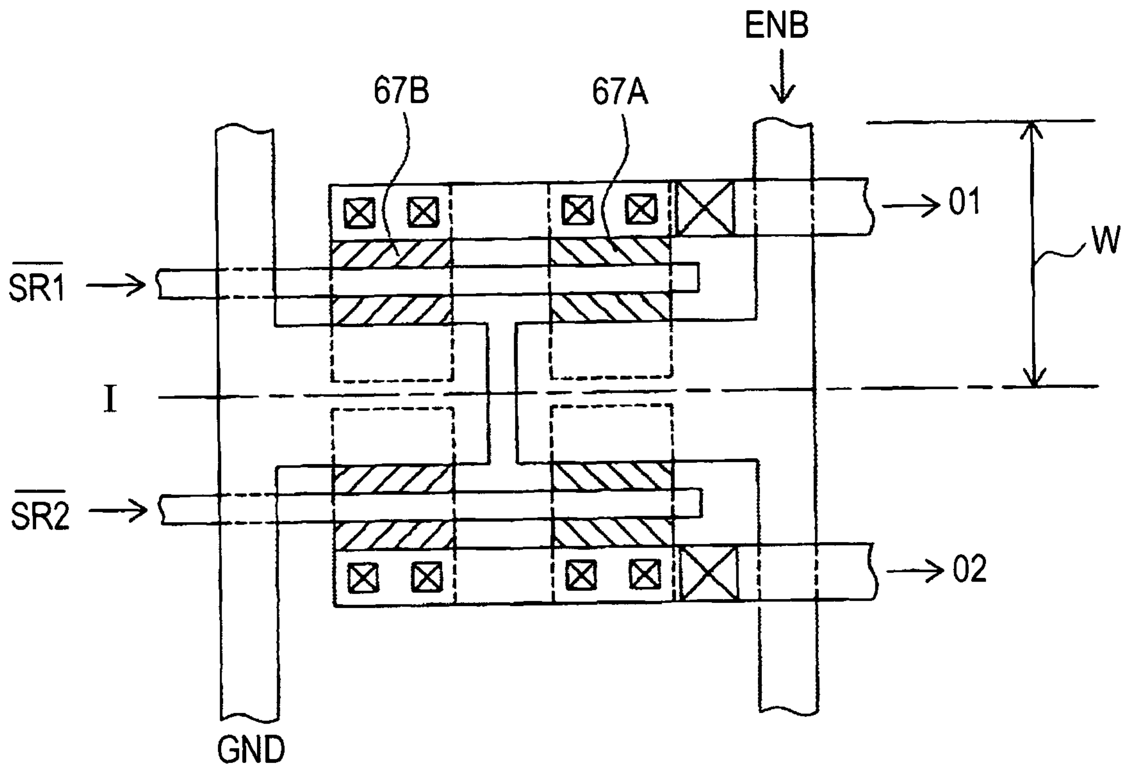
FIG. 15 is a diagram illustrating a partial circuit layout of the NAND circuit shown in FIG. 12.

FIG. 10 shows the specific structure of the scanning-line driving circuit 104 when the number of scanning lines is 4 and FIG. 11 is a timing diagram in the scanning-line driving circuit 104 shown in FIG. 10. FIG. 12 shows the specific structure of the NAND circuit 67 provided in the scanning-line driving circuit 104 and FIG. 13 shows a truth table of the NAND circuit 67. FIGS. 14 and 15 show a specific circuit layout of the NAND circuit 67.

As shown in FIG. 10, the scanning-line driving circuit 104 includes a shift register 66 to which, for example, a clock signal CLY and an inverted clock signal CLY' from the controller 61 shown in FIG. 4 are input and an output control section 69 to which the output of the shift register 66 is input and which has 2m logical circuits corresponding to the 2m scanning lines 3a. Each logical circuit includes, for example, a NAND circuit 67 and a NOT circuit 68. The output of the shift register 66 and enable signals ENB1 and ENB2 are input to the NAND circuit 67.

Also when a transmission gate to which the output signal of the shift register 66 and the enable signals are input is employed instead of the NAND circuit 67, the same advantages can be obtained.

The wire for the enable signal ENB1 is connected to the first NAND circuit 67 in the partial surface 201 but is connected to the second (the fourth as a whole) NAND circuit 67 in the partial surface 202. On the contrary, the wire for the enable signal ENB2 is connected to the second and first (the third as a whole) NAND circuits 67. That is, the enable signals ENB1 and ENB2 have different orders of connection to the NAND circuits 67. Accordingly, by constructing the scanning-line driving circuit 104 in this way, it is possible to properly drive the electro-optical device.

As shown in FIG. 11, start pulses SR1 to SR4 from the shift register 66 are output to the respective scanning lines 3a at the same time as if they simultaneously scan the partial surfaces 201 and 202. That is, the start pulses SR1 and SR3 corresponding to the first scanning line 3a and the start pulses SR2 and SR4 corresponding to the second scanning lines in the partial surfaces 201 and 202 are alternately output every two horizontal periods. On the other hand, the enable signals ENB1 and ENB2 alternately rise every horizontal period. Accordingly, the start pulse output at the time of rising is selected by the logical circuits and is output to the scanning lines 3a as a scanning signal. As a result, the scanning signals G1 to G4 are output in the order of G1, G3, G2, and G4 as shown in the figures, thereby embodying the horizontal scanning operation (see FIG. 6 or 7).

Now, the structure of the NAND circuit 67 according to the first embodiment will be described.

As shown in FIG. 12, each NAND circuit 67 has a very simple structure including a CMOS (Complementary Metal-Oxide Semiconductor) inverter having a p-type MOSFET 67A and an n-type MOSFET 67B, that is, an AND circuit having a "complementary inverter", and a NOT circuit 67c connected to the output terminal thereof. The p-type MOSFET 67A and the n-type MOSFET 67B are connected in series between the signal line for the enable signal ENB1 or ENB2 and the ground and the inverted signals SR' of the start pulses SR are input to the gate terminals thereof. The inverted signals SR' may be obtained by inverting the start pulses SR, but may be obtained more simply by providing a construction that the internal signal of the shift register 66 is considered as the start pulse SR on the premise of the signal inversion in the shift register 66 and the output from the shift register 66 becomes the inverted signal SR'. The NOT circuit 67c can also be composed of a CMOS inverter to have the same circuit structure as the AND circuit.

FIG. 13 shows a truth table of the AND circuit. Here, when the input start pulse SR is "High" and the enable signal ENB is "Low", the gate voltages of the MOSFETs 67A and 67B are "Low", thereby turning on the p-type MOSFET 67A and turning off the n-type MOSFET 67B. Accordingly, since the enable signal ENB with a potential of 0V is applied to the turned-on p-type MOSFET 67A but a threshold voltage (for example, 1.5V) exists between the source and the drain of the p-type MOSFET 67A, the signal output at the point O does not have 0V but an effective value of, for example, about 1.5V.

However, since the NOT circuit 67C disposed at the stage next to the point O has a threshold voltage of about 7.5V as an inverter, the variation in the Low voltage of about 1.5V can be neglected and the signal output can be also considered as "Low". The threshold voltage of 7.5V is embodied when the NOT circuit 67C is, for example, a normal inverter to be driven with a source voltage of 15V. In other words, since the NAND circuit 67 is employed in a high-voltage circuit system such as the output circuit of the scanning signal Gx, its normal operation is secured.

The scanning-line driving circuit 104 according to the first embodiment has the circuit layout, for example, shown in FIG. 14. That is, the respective formation areas for the shift register 66 and the output control section 69 are adjacent to the image display area 10*a* and unit circuits corresponding to the respective scanning lines 3*a* are formed in unit areas W. The NAND circuit 67 has the layout, for example, shown in FIG. 15 such that the NAND circuit is received in the unit area W of the output control section 69 indicated by the hatched lines. FIG. 15 shows a structure of a CMOS which is the AND circuit of the NAND circuit 67.

A normal NAND circuit has 6 gates, but it is difficult to form the 6 gates in the narrow unit area W. Specifically, the width of the unit area W is further narrowed with decrease in pixel pitch and for example, when the pixel pitch is 10 μm, there is left only a room for forming at most two gates in parallel. Accordingly, in the first embodiment, since the output control section 69 has a very simple structure, it is possible to easily manufacture the electro-optical device and in addition to further decrease the pitch. In addition, since the number of gates is small, it is also possible to reduce the power consumption of the driving circuit unit 60.

As shown in FIG. 15, in the AND circuit described above, two unit circuits are disposed with mirror symmetry about Line I and have a two cycle structure. As a result, the AND circuit can be efficiently manufactured, thereby decreasing the pitch of the device.

2. Second Embodiment

Now, an electro-optical device according to a second embodiment of the present invention will be described with reference to FIGS. 16 to 18.

Figure 16:
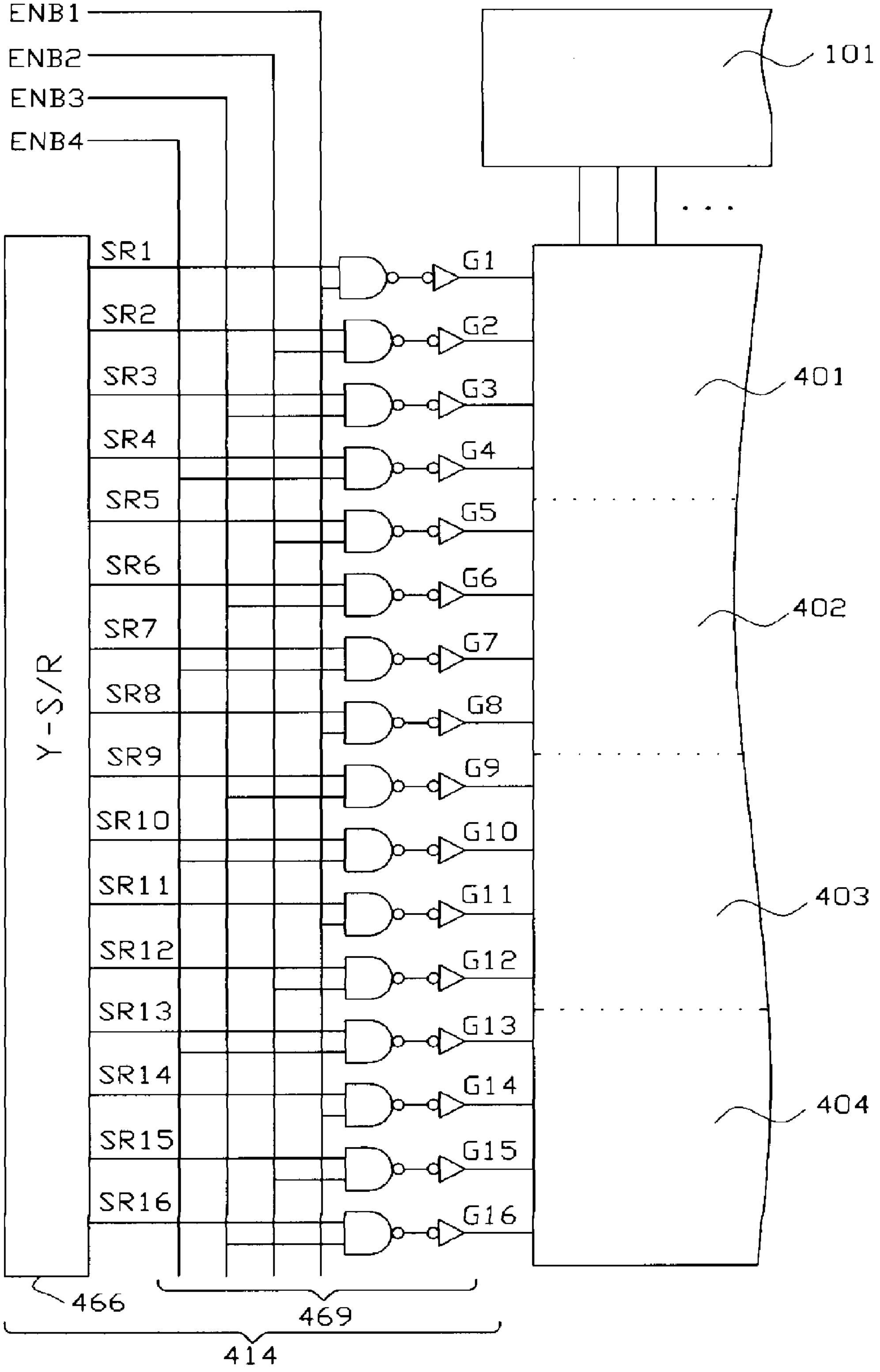
FIG. 16 is a block diagram illustrating the structure of a drive system of an electro-optical device according to a second embodiment.

FIG. 16 shows a structure of an important part of the electro-optical device according to the second embodiment. FIG. 17 is a timing diagram illustrating a driving method of the electro-optical device and FIG. 18 is a diagram illustrating a screen picture during writing data with the lapse of time to correspond to the timing diagram shown in FIG. 17.

The electro-optical device according to the second embodiment has almost the same structure as the first embodiment, but is different therefrom in that a screen is divided into four partial surfaces 401 to 404 and then is driven in a surface inversion manner. Accordingly, elements similar to those of the first embodiment are denoted by the same reference numerals and description thereof is properly omitted.

The partial surfaces 401 to 404 are areas in which the neighboring partial surfaces are driven in a field inversion manner with cycles complementary to each other and include four scanning lines 3*a*, respectively. That is, the areas of the partial surfaces 401 to 404 are equal to each other. The scanning-line driving circuit 414 has a structure that one drive circuit with a shift register 466 simultaneously generate and outputs four start pulses SR and four enable signals ENB1 to ENB4 for deviating the output time of the scanning signals are input to an output control section 469. The four start pulses SR are output to the partial surfaces 401 to 404, respectively, with a pulse width of a horizontal scanning period. The enable signals ENB1 to ENB4 are output at different times in a horizontal scanning period, respectively, with a pulse width of a ¼ horizontal scanning period.

Figure 17:
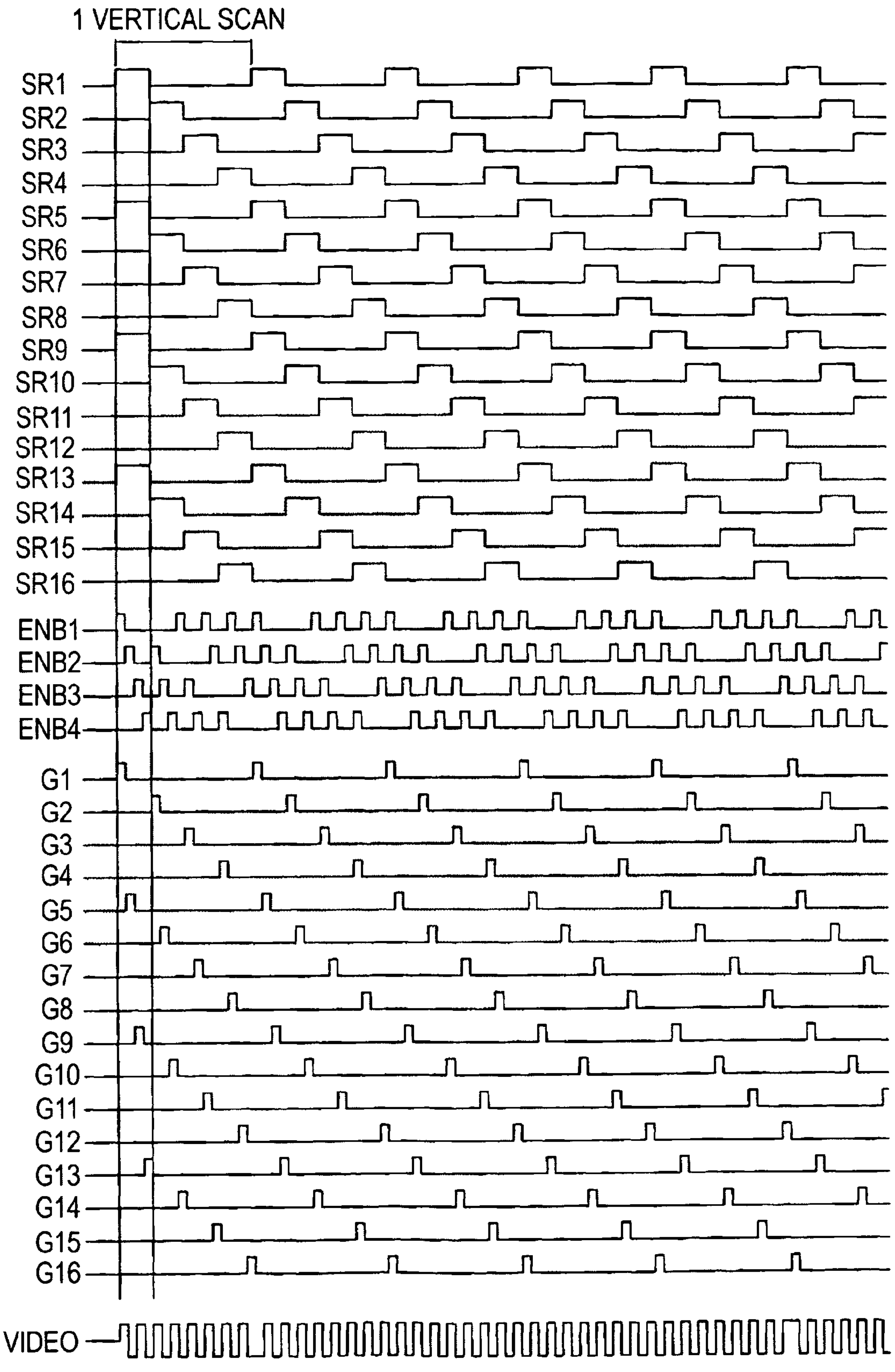
FIG. 17 is a timing diagram illustrating a driving method of the electro-optical device according to the second embodiment.

In the driving method shown in FIG. 17, the horizontal scanning operation is sequentially performed to the pixel portions of the respective partial surfaces 401 to 404. For example, in the first horizontal period, the 1m-th scanning line 3*a* is scanned with a scanning signal G1*m* and a data signal Sx with a positive potential is written to the pixel portions. In the second horizontal period, the fifth scanning line 3*a* is scanned with a scanning signal G5 and a data signal Sx with a negative potential is written to the pixel portions. In the third horizontal period, the ninth scanning line 3*a* is scanned with a scanning signal G9 and a data signal with a positive potential is written to the pixel portions. In the fourth horizontal period, the thirteenth scanning line 3*a* is scanned with a scanning signal G13 and a data signal Sx with a negative potential is written to the pixel portions. Thereafter, theses selective writing operations are sequentially performed to the partial surfaces 401 to 404.

At this time, by deviating the output times of four start pulses SR1, SR5, SR9, and SR13 from each other by the use of the enable signals ENB1 to ENB4 and reducing the output periods to ¼, the horizontal scanning operation by the scanning signals Gx is simultaneously performed to the partial surfaces 401 to 404. On the other hand, the data-line driving circuit 101 inverts the polarity of the data signal Sx in synchronization with the horizontal scanning operation to make the polarity of the data signal Sx in the partial surfaces 401 and 403 different from the polarity of the data signal Sx in the partial surfaces 402 and 404 in a screen. As a result, the partial surfaces 401 and 404 are driven to alternate the polarities thereof (see FIG. 18).

In this way, since the horizontal scanning operation is alternately performed to the partial surfaces with a positive polarity and the partial surfaces with a negative polarity, the data signals Sx supplied to the data lines 6*a* are alternated. As a result, since the potentials of the data lines 6*a* are always switched between the positive polarity and the negative polarity and thus are not deviated to one polarity, the possibility of leaking the electric charges accumulated in the storage capacitors 70 of the pixel portions is reduced.

In the second embodiment, since the surface inversion type driving method is performed to the respective partial surfaces 401 to 404, the alignment failure in the liquid crystal layer 50 due to the transverse electric field is little generated. In addition, since the difference in the amount of charges leaked from the TFTs 30 in the upper part and the lower part of the screen is not great, it is possible to avoid the non-uniformity in display depending upon positions in the screen.

Figure 18:
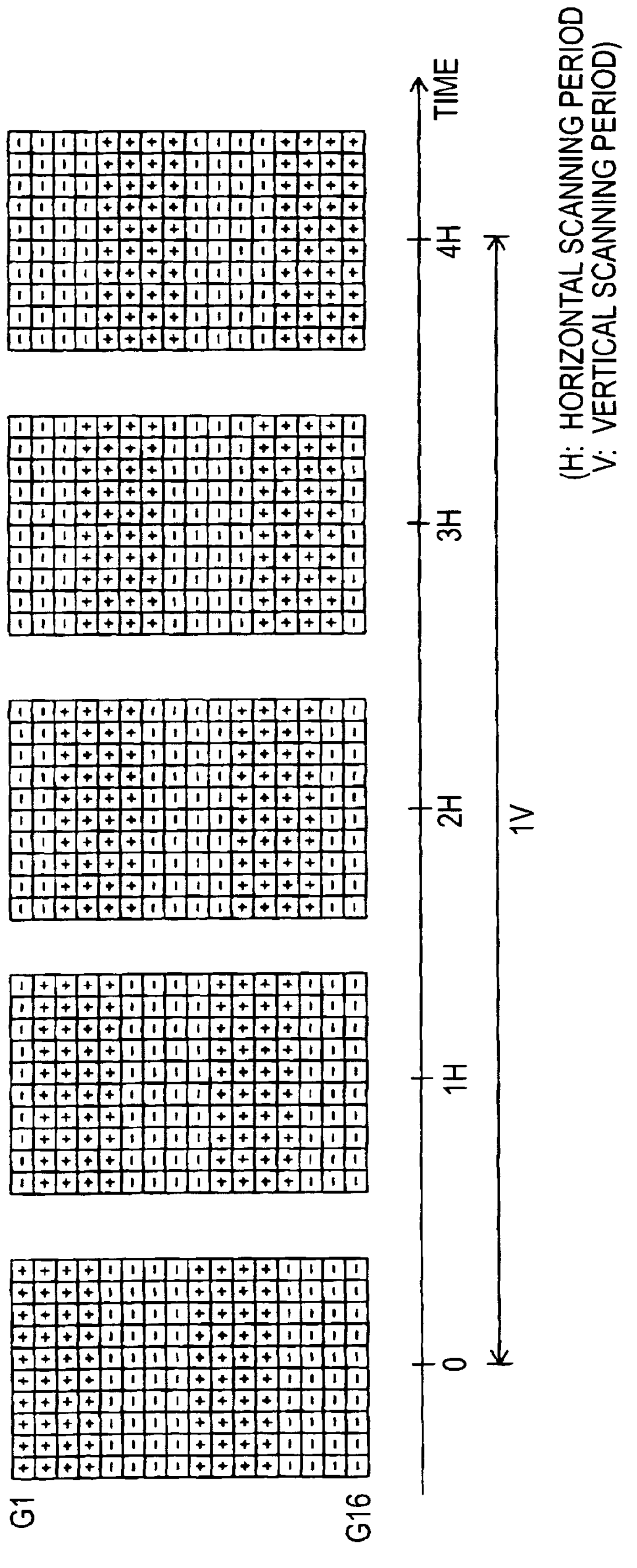
FIG. 18 is a diagram illustrating the driving method of the electro-optical device according to the second embodiment.

As shown in FIG. 18, when ¼ of the screen, that is, the partial surfaces 401 to 404, is completely scanned, the positive-polarity areas and the negative-polarity areas are completely inverted, which means that the re-writing operation corresponding to one screen is performed. According to this method, when the entire screen is scanned, the re-writing operation is performed four times. Accordingly, when the scanning-line driving circuit 414 and the data-line driving circuit 101 are driven at four times speed, one vertical period with respect to the input image signals can be reduced to ¼, thereby satisfactorily suppressing the flickers.

According to the second embodiment, similarly to the first embodiment, the decrease in contrast ratio or the decrease in aperture ratio of the pixels can be prevented, thereby accomplishing the decrease in pitch. In addition, the display noises due to the leakage of charges can be prevented, thereby remarkably improving the display quality. Other advantages are similar to those of the first embodiment.

3. Modified Examples

Next, modified examples of the above-mentioned embodiments will be described with reference to FIGS. 19 and 20.

In the above-mentioned embodiments, the areas of the respective partial surfaces are equal to each other, but the sizes of the partial surfaces may not be equal to each other. In this case, the sums of areas of the partial surfaces to be driven with the complementary cycles are almost equal to each other and two kinds of partial surfaces are horizontally scanned in turn, thereby alternating the data signals and supplying the alternated data signals to the pixel portions.

Figure 19:
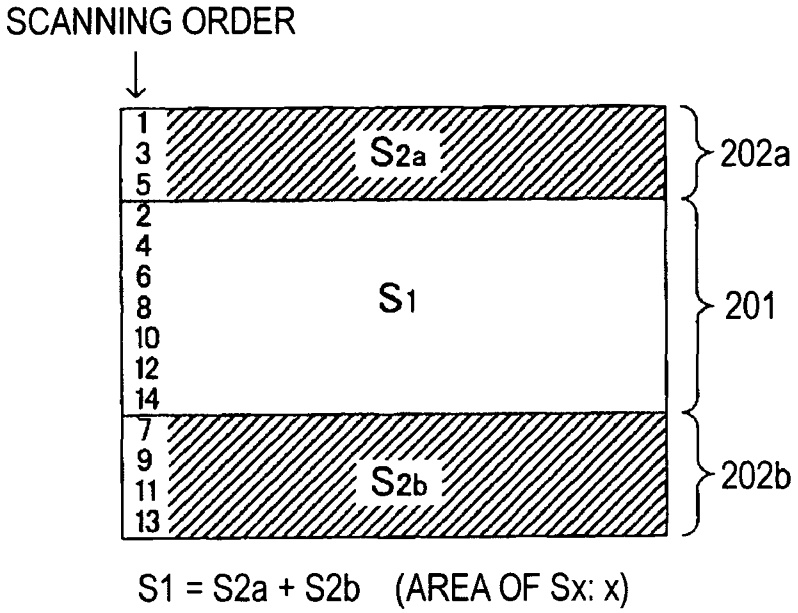
FIG. 19 is a diagram illustrating a driving method of an electro-optical device according to a modified example of the embodiment.

FIG. 19 shows a modified example that a screen is divided into three areas for drive as a specific example thereof. In this case, the screen is divided into a partial surface 201 and partial surfaces 202$a$ and 202$b$ and the partial surfaces are driven with cycles complementary to each other. Here, the area S1 of the partial surface 201 and the total area S2$a$+S2$b$ of the partial surfaces 202$a$ and 202$b$ are set equal to each other. As a result, the numbers of scanning lines in the two kinds of partial surfaces are equal to each other, thereby alternately horizontally scanning the two kinds of partial surfaces. The order of horizontal scanning operation can be considered in various ways. For example, as shown in the figure, the horizontal scanning operation may be performed in the order of partial surface 202$a$→partial surface 202→partial surface 202$b$ and may be sequentially performed from the upside to the downside in the respective partial surfaces.

Figure 20:
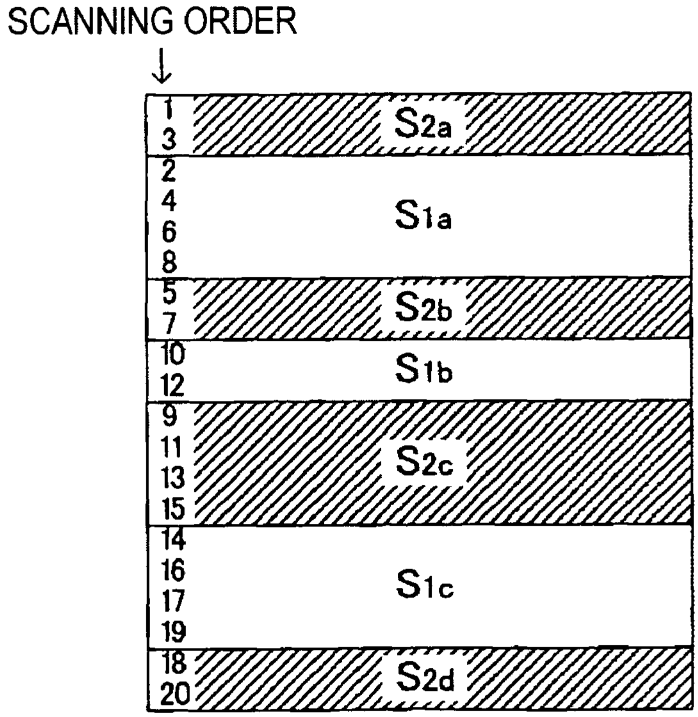
FIG. 20 is a diagram illustrating a driving method of an electro-optical device according to a modified example of the embodiment.

FIG. 20 shows a modified example in which a screen is divided into seven areas for drive. In this case, the screen is divided into seven partial surfaces and neighboring partial surfaces are driven with cycles complementary to each other. The total areas of two kinds of partial surfaces with difference cycles, that is, S1$a$+S1$b$+S1$c$+ . . . and S2$a$+S2$b$+S2$c$+ . . . are set equal to each other. As a result, the numbers of scanning lines in the two kinds of partial surfaces are equal to each other, thereby alternately horizontally scanning the two kinds of partial surfaces. The order of horizontal scanning operation may be regular like the above-mentioned modified example and may be random as shown in the figure (where the partial surfaces having different cycles for polarity inversion are necessarily alternately selected).

4. Electronic Apparatus

Figure 21:
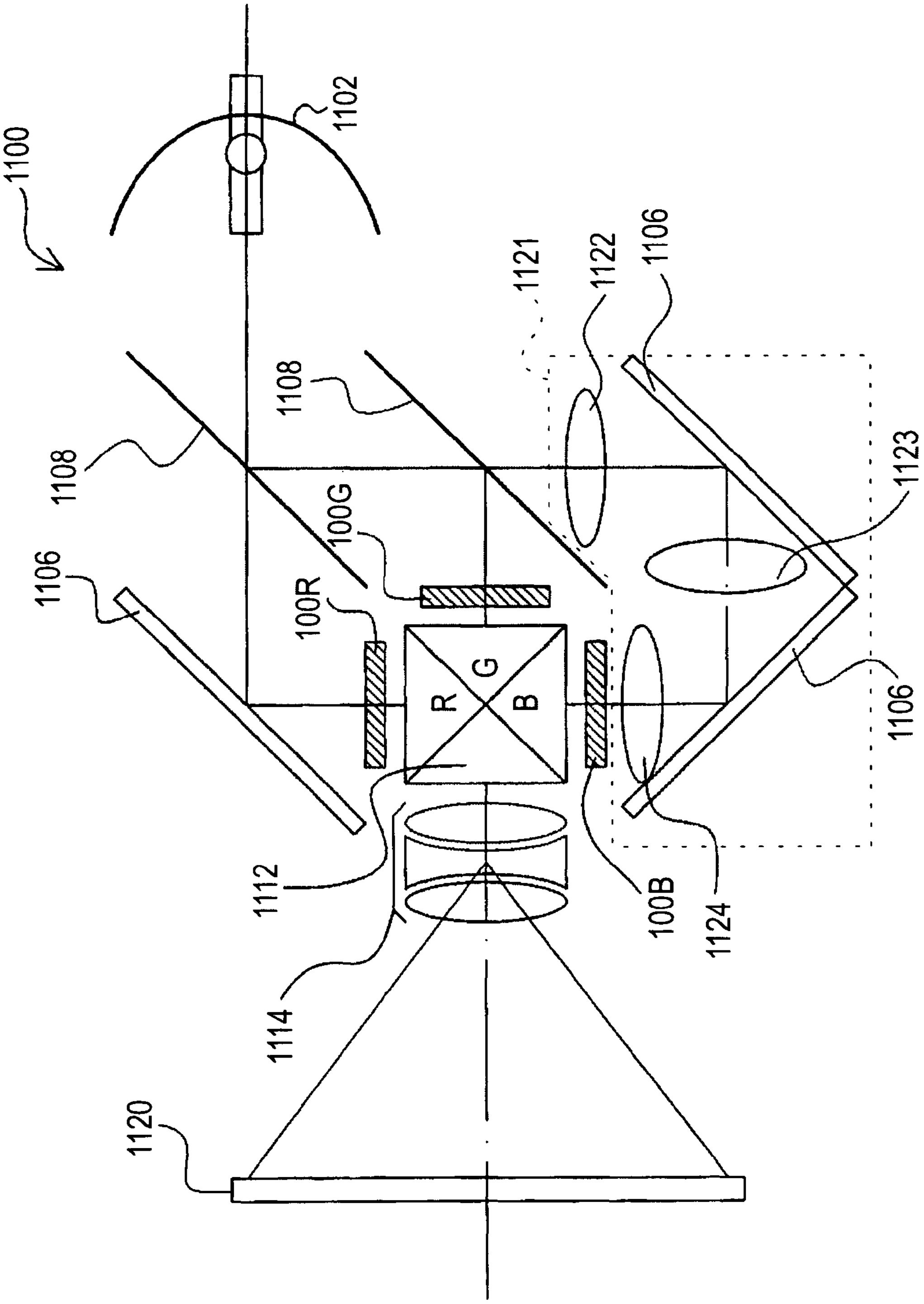
FIG. 21 is a schematic cross-sectional view illustrating an example of a transmissive color display as an example of an electronic apparatus employing the electro-optical device according to the present invention.

Next, a specific example of a transmissive color display as an electronic apparatus using the above-described electro-optical device as a light valve will be described with reference to FIG. 21. FIG. 21 is a schematic cross-sectional view illustrating the transmissive color display.

As shown in FIG. 21, in a liquid crystal projector 1100 which is an example of the transmissive color display according to the first or second embodiment, three liquid crystal modules including a liquid crystal display in which a drive circuit is mounted on a TFT array substrate are prepared and are used as light valves 100R, 100G, and 100B for RGB, respectively. In the liquid crystal projector 1100, when light is emitted from a lamp unit 1102 as a white light source such as a metal halide lamp, the emitted light is divided into light components R, G, and B corresponding to three primary colors of RGB through three sheets of mirrors 1106 and two sheets of dichroic mirrors 1108 and the divided light components are guided to the light valves 100R, 100G, and 100B corresponding to the respective colors. At this time, the light component of B is guided through a relay lens system 1121 including an incident lens 1122, a relay lens 1123, and an exit lens 1124 so as to prevent the loss of light due to the long optical path. The light components corresponding to the three primary colors modulated by the light valves 100R, 100G, and 100B are synthesized by a dichroic prism 1112 again and then the synthesized light is enlarged and projected as a color image onto a screen 1120 through a projection lens 1114.

The transmissive color display can display an image with high accuracy and excellent uniformity in which noises such as flickers are very small, by using the electro-optical device according to the above-mentioned embodiments.

The invention is not limited to the above-mentioned embodiments, but may be appropriately modified without departing from the gist or spirit of the invention which can be read out from the appended claims and the entire specification. The drive circuit of an electro-optical device, the driving method of an electro-optical device, and the electro-optical device including such modifications belong to the technical scope of the invention. For example, it has been described in the above-mentioned embodiments that a screen is divided into two or four partial surfaces for drive, where the partial surfaces are field-inverted with cycles complementary to each other. However, the number of partial surfaces is not limited to them, but the number of partial surfaces may be greater. However, as the number of partial surfaces increases, the number of boundaries between partial surfaces where the transverse electric field is generated increases.

Although an active matrix liquid crystal display employing TFTs has been exemplified in the above-mentioned embodiments, the invention is not limited to it. For example, the invention can apply to a liquid crystal display using TFD (Thin Film Diode) as a pixel switching element or a passive matrix liquid crystal display. In addition to the liquid crystal display, the invention can apply to an electro-optical device performing a matrix driving operation with temporal or spatial inversion of polarity. Examples of such an electro-optical device can include an electroluminescence device, an electrophoresis device, and a display using an electron emission element (Field Emission Display and Surface-Conduction Electron-Emitter Display).

What is claimed is:

1. A drive circuit for driving an electro-optical device that includes a plurality of data lines and a plurality of scanning lines extending to intersect each other and a plurality of pixel portions which are connected to the data lines and the scanning lines and which constitute a display surface, the drive circuit comprising:

a scanning-line driving unit that supplies scanning signals to the plurality of scanning lines; and a data-line driving unit that supplies image signals to the plurality of data lines, wherein the scanning-line driving unit and the data-line driving unit drive, in a surface inversion manner, 2M (where M is a natural number greater than or equal to 2) partial surfaces that result from dividing the display surface by an imaginary division line that extends in a direction in which the scanning lines extend, each partial surface including n (where n is a natural number greater than or equal to 2) scanning lines and each partial surface having a designation as either an odd partial surface or an even partial surface, wherein the scanning-line driving unit and the data-line driving unit drive, in a first cycle, the pixel portions in the odd partial surfaces of the 2M partial surfaces with respect to a direction in which the data lines extend, and drive, in a second cycle that is complementary to the first cycle, the pixel portions in the even partial surfaces of the 2M partial surfaces, wherein the scanning-line driving unit includes:

an output control section having logical circuits, each logical circuit having an output connected to one of the scanning lines, an input for receiving a pulse signal, and an input for receiving an enable signal, and a shift register that outputs pulse signals to the logical circuits to simultaneously select one scanning line from each of the odd and the even partial surfaces during each of a plurality of output periods, wherein within each of the plurality of output periods, 2M enable signals (where M is a natural number greater than or equal to 2) are sequentially supplied to enable, one at a time, each of the simultaneously selected scanning lines, wherein a sequence of the 2M enable signals during each of the plurality of output periods is different from both a sequence of the 2M enable signals of the output period immediately preceding and the output period immediately following the each of the plurality of output periods, and wherein the sequences of the 2M enable signals change in a cyclical manner.

2. The drive circuit according to claim 1, wherein the output control section includes (i) an AND circuit receiving the 2M enable signals and having a complementary transistor in which any one of the 2M enable signals and the pulse signals are input to an input terminal thereof and (ii) an inverter circuit connected to an output terminal of the AND circuit.

3. The drive circuit according to claim 2, wherein respective signal lines for the 2M enable signals are disposed to extend between the display surface and the shift register and branch lines are branched therefrom so as to correspond to the scanning lines which are selected from the 2M partial surfaces, respectively, and which have different arrangements in the respective partial surfaces.

4. The drive circuit according to claim 2, wherein the scanning-line driving unit and the data-line driving unit continuously perform a writing operation of the image signals corresponding to one screen by n times with inversion of polarity every time within a display period corresponding to one screen.

5. The drive circuit according to claim 2, wherein the scanning-line driving unit performs the horizontal scanning operation to the pixel portions in each of the odd partial surfaces and the even partial surfaces or in the partial surfaces in a random order regardless of the order corresponding to the direction parallel to the data lines.

6. The drive circuit according to claim 2, wherein a threshold voltage of the complementary transistor in the AND circuit is smaller than a threshold voltage of an inverter in the inverter circuit.

7. The drive circuit according to claim 2, wherein the AND circuit and the inverter circuit include a plurality of unit circuits corresponding to the plurality of scanning lines and the plurality of unit circuits are formed in a plurality of unit areas which are disposed adjacent to the display surface and parallel to each other, respectively.

8. An electro-optical device comprising the drive circuit according to Claim 1.

9. A driving method of driving an electro-optical device that includes a plurality of data lines and a plurality of scanning lines extending to intersect each other and a plurality of pixel portions which are connected to the data lines and the scanning lines and which constitute a display surface, the driving method comprising:

driving, in a surface inversion manner, 2M (where M is a natural number greater than or equal to 2) partial surfaces that result from dividing the display surface by an imaginary division line that extends in a direction in which the scanning lines extend, each partial surface including n (where n is a natural number greater than or equal to 2) scanning lines and each partial surface having a designation as either an odd partial surface or an even partial surface, driving, in a first cycle, the pixel portions in the odd partial surfaces of the 2M partial surfaces with respect to a direction in which the data lines extend, and driving, in a second cycle that is complementary to the first cycle, the pixel portions in the even partial surfaces of the 2M partial surfaces, and alternately performing a horizontal scanning operation to the pixel portions in the odd partial surfaces and a horizontal scanning operation to the pixel portions in the even partial surfaces by outputting pulse signals to the logical circuits to simultaneously select scanning lines from the 2M partial surfaces, outputting 2M enable signals (where M is a natural number greater than or equal to 2) indicating different enable periods, and outputting the pulse signals on the basis of the 2M enable signals and the pulse signals, wherein within each of plurality of output periods, 2M enable signals are sequentially supplied to enable, one at a time, each of the simultaneously selected scanning lines, wherein a sequence of the 2M enable signals during each of the plurality of output periods is different from both a sequence of the 2M enable signals of the output period immediately preceding and the output period immediately following the each of the plurality of output periods.

10. The driving method according to claim 9, wherein logical products are output as the pulse signals, by the use of (i) an AND circuit having a complementary transistor in which any one of the 2M enable signals and the pulse signals are input to an input terminal thereof and (ii) an inverter circuit connected to an output terminal of the AND circuit.

* * * * *